US009617652B2

(12) United States Patent
Abraham et al.

(10) Patent No.: US 9,617,652 B2
(45) Date of Patent: Apr. 11, 2017

(54) BUBBLE AND FOAM SOLUTIONS USING A COMPLETELY IMMERSED AIR-FREE FEEDBACK FLOW CONTROL VALVE

(71) Applicant: Lam Research Corporation, Fremont, CA (US)

(72) Inventors: Richard Abraham, Sherwood, OR (US); Robert Rash, Portland, OR (US); David W. Porter, Sherwood, OR (US); Steven T. Mayer, Lake Oswego, OR (US); John Ostrowski, Lake Oswego, OR (US)

(73) Assignee: Lam Research Corporation, Fremont, CA (US)

( * ) Notice: Subject to any disclaimer, the term of this patent is extended or adjusted under 35 U.S.C. 154(b) by 227 days.

(21) Appl. No.: 14/102,220

(22) Filed: Dec. 10, 2013

(65) Prior Publication Data

US 2014/0166476 A1    Jun. 19, 2014

Related U.S. Application Data

(60) Provisional application No. 61/735,943, filed on Dec. 11, 2012.

(51) Int. Cl.
*C25B 9/00*     (2006.01)
*C25B 15/08*    (2006.01)
(Continued)

(52) U.S. Cl.
CPC ............ *C25D 21/04* (2013.01); *C25D 17/00* (2013.01); *C25D 17/001* (2013.01); *C25D 5/08* (2013.01); *C25D 17/008* (2013.01); *C25D 21/12* (2013.01)

(58) Field of Classification Search
CPC ........... C25B 9/00; C25B 15/08; C25B 15/02; C25D 17/001; C25D 17/02; C25D 17/00;
(Continued)

(56) References Cited

U.S. PATENT DOCUMENTS

| 1,255,395 | A | * | 2/1918 | Duram | ............... B01D 19/0042 |
| | | | | | 96/158 |
| 2,432,973 | A | * | 12/1947 | Smedberg | ................ B01J 8/003 |
| | | | | | 204/246 |

(Continued)

OTHER PUBLICATIONS

U.S. Appl. No. 09/872,340, filed May 31, 2001, entitled "Methods and Apparatus for Bubble Removal in Wafer Wet Processing".

(Continued)

*Primary Examiner* — Zulmariam Mendez
(74) *Attorney, Agent, or Firm* — Weaver Austin Villeneuve & Sampson LLP

(57) ABSTRACT

The embodiments disclosed herein relate to methods and apparatus for promoting bubble-free circulation of processing fluids in a recirculation system. Certain disclosed techniques involve passive, mechanical valve designs that promote variable resistance to flow in a drain. Other techniques involve automated flow control schemes that utilize feedback from flow meters, level sensors, etc. to achieve a balanced and bubble-free flow. The disclosed embodiments greatly reduce the incorporation of gas into a processing fluid, in particular as the processing fluid returns from a processing cell to a reservoir.

18 Claims, 18 Drawing Sheets

(51) Int. Cl.
*C25D 17/02* (2006.01)
*C25D 3/08* (2006.01)
*C25C 7/00* (2006.01)
*C25F 7/00* (2006.01)
*C25D 21/04* (2006.01)
*C25D 17/00* (2006.01)
*C25D 5/08* (2006.01)
*C25D 21/12* (2006.01)

(58) Field of Classification Search
CPC .... C25D 5/08; C25C 3/08; C25C 7/00; C25F 7/00
USPC .................................. 204/228.3, 237, 242
See application file for complete search history.

(56) References Cited

U.S. PATENT DOCUMENTS

| | | |
|---|---|---|
| 3,849,002 A | 11/1974 | Hach |
| 4,101,919 A | 7/1978 | Ammann |
| 4,229,191 A | 10/1980 | Moore |
| 4,297,217 A | 10/1981 | Hines et al. |
| 5,831,727 A | 11/1998 | Stream |
| 6,004,470 A | 12/1999 | Abril |
| 6,193,854 B1 | 2/2001 | Lai et al. |
| 6,193,859 B1 | 2/2001 | Contolini et al. |
| 6,551,487 B1 | 4/2003 | Reid et al. |
| 6,582,578 B1 | 6/2003 | Dordi et al. |
| 6,773,571 B1* | 8/2004 | Mayer ............... C25D 17/12 204/232 |
| 2002/0027080 A1* | 3/2002 | Yoshioka ........... C25D 17/02 205/123 |
| 2011/0083965 A1* | 4/2011 | Reid .................. C25D 3/38 205/101 |

OTHER PUBLICATIONS

US Office Action, dated Aug. 31, 2005, issued in U.S. Appl. No. 09/872,340.
US Office Action, dated Apr. 14, 2005, issued in U.S. Appl. No. 09/872,340.
US Office Action, dated Jan. 18, 2006, issued in U.S. Appl. No. 09/872,340.
US Office Action, dated May 26, 2006, issued in U.S. Appl. No. 09/872,340.
US Office Action, dated Nov. 8, 2006, issued in U.S. Appl. No. 09/872,340.
US Final Office Action, dated Mar. 14, 2007, issued in U.S. Appl. No. 09/872,340.
U.S. Appl. No. 15/442,519, filed Feb. 24, 2017, Abraham et al.

* cited by examiner

BUBBLE AND FOAM SOLUTIONS USING A COMPLETELY IMMERSED AIR-FREE FEEDBACK FLOW CONTROL VALVE

CROSS-REFERENCE TO RELATED APPLICATIONS

This application claims benefit of prior filed U.S. Provisional Application No. 61/735,943, titled "PLATING CELL FLUID RETURN BUBBLE PREVENTION PROCESS AND HARDWARE," and filed Dec. 11, 2012, which is herein incorporated by reference in its entirety and for all purposes.

BACKGROUND

Floor space in a semiconductor clean room manufacturing facility can be very expensive from a footprint (area) prospective. To minimize the cost of fabrication, some processing tools increasingly employ a more compact design having a stacked module vertical architecture. Such a stacked approach of electrochemical plating cells may increase the effective tool output per unit area and reduce the effective implementation costs when amortized over the life of the tool. The Sabre3D™ plating system by Lam Research Corporation of Fremont, Calif., is an example of a two level stacked plating module architecture. Wafer processing systems using condensed fluid in a mixed phase environment (e.g., air/gas exposed to liquid) often use circulation to recycle and reuse the operating fluids. This circulation may entrap and create bubbles and foam in the liquid during circulation of the fluid from one portion or region of the tool to another. While certain techniques have been developed to minimize the impact of these bubbles (e.g., including a degasser in a fluid feed line), these techniques are generally costly to implement. As such, methods and apparatus for preventing the introduction of gas into the processing fluid are desired.

SUMMARY

Some implementations described herein relate to methods, apparatus, and systems for controlling the flow of electrolyte when plating a metal in features on a wafer substrate, controlling and monitoring the fluid flow between a plating cell and plating bath reservoir, and controlling the chemical composition and conditions within the plating cell and plating bath reservoir. Certain applications that may benefit from the disclosed embodiments include common areas of wafer processing including damascene plating, through silicon via (TSV) applications involving plating copper in high aspect ratio lines and vias (e.g., vias having aspect ratios greater than about 10:1) with relatively large openings (e.g., at least about a 5 micrometer diameter), and though resist plating (e.g., deposition employed in wafer level packaging).

In order to avoid the deleterious effects of trapped air, bubbles, and foam in the circulation of the fluids in the apparatus, methods and apparatus for controlling the return of electrolyte from one part of the apparatus at an elevated location relative to another portion at a lower elevation with a minimal amount of mixing of air and liquid is described. In implementations disclosed herein, the gravity driven return flow is mechanically or automatically modulated/controlled by a level sensitive feedback flow restriction valve. The state of the valve may be controlled based on the level of fluid in an upper containment vessel, cell, or trough, which typically only changes by small amounts (e.g., less than about 1 inch). The system may be designed and operated in a manner to ensure that there are minimal vertical drops of fluid in a mixed phase (air and water), and that the valve is always fully immersed in liquid.

In one aspect of the disclosed embodiments, an apparatus for electroplating material onto a substrate is provided, including: an electroplating cell including: a vessel for holding electrolyte; a weir wall positioned at the periphery of the vessel; and a fluid collection trough substantially surrounding the weir wall, such that during electroplating, electrolyte flows into the vessel, over the weir wall and into the fluid collection trough; an electrolyte reservoir; a return conduit for delivering electrolyte from the fluid collection trough to the electrolyte reservoir; and a flow control mechanism for variably increasing and decreasing a resistance to flow in the return conduit, where the flow control mechanism substantially prevents the passage of gas into the return conduit during electroplating.

In various embodiments, the flow control mechanism includes a float and a flow constrictor, where the float is configured to rise with the level of electrolyte in the fluid collection trough to thereby raise the flow constrictor and increase flow through the return conduit. In some cases, the float and flow constrictor are separate elements. The flow constrictor may be substantially spherical in some cases. In other cases, the flow constrictor is shaped like a cone or a truncated cone. The flow constrictor may also be a flap that covers an inlet to the return conduit, where the flap swings about a connection point to variably control the resistance to flow through the return conduit. The float and flow constrictor may be integrated into a single unit in some embodiments.

The apparatus may also include a flow constricting region in the fluid collection trough or return conduit, where the flow constrictor and the flow constricting region are configured to mate with one another. In some embodiments, the flow constrictor and the flow constricting region mate with one another to form a fluid tight seal. In other cases, the apparatus may include a drain path through which electrolyte may drain from the fluid collection trough into the return conduit even when the flow constrictor and the flow constricting region are mated with one another in a closed position.

In some embodiments, the apparatus may also include baffles positioned proximate the float and/or flow constrictor, where the baffles operate to prevent formation of vortices in the electrolyte. In these or other embodiments, the apparatus may include one or more float constricting elements that restrict where the float may be in the fluid collection trough. An overflow conduit may be used in some cases for delivering electrolyte from the fluid collection trough to the electrolyte reservoir, where an inlet to the overflow conduit is positioned above a target fluid level in the fluid collection trough. A flow sensor may be used to sense the presence or absence of flow through the overflow conduit. In certain implementations, an outlet of the return conduit is positioned below a level of electrolyte in the electrolyte reservoir.

In certain implementations, the apparatus may also include a secondary fluid collection trough positioned in the return conduit for holding electrolyte after it leaves the fluid collection trough and before it enters the electrolyte reservoir, where the flow control mechanism is positioned in the secondary fluid collection trough. The apparatus may also include an additional electroplating cell, where the return conduit includes a first inlet for receiving electrolyte from the electroplating cell and a second inlet for receiving electrolyte from the additional electroplating cell.

In another aspect of the disclosed embodiments, an apparatus for electroplating material onto a substrate is provided, including: an electroplating cell including: a vessel for holding electrolyte; a weir wall positioned at the periphery of the vessel; and a fluid collection trough substantially surrounding the weir wall, such that during electroplating, electrolyte flows into the vessel, over the weir wall and into the fluid collection trough; an electrolyte reservoir; a return conduit for delivering electrolyte from the fluid collection trough to the electrolyte reservoir; a plating recirculation loop including the electrolyte reservoir, a first pump, the electroplating cell and the return conduit; and a bypass conduit, where the bypass conduit branches off of the plating recirculation loop at a point before the electrolyte reaches the electroplating cell, where the bypass conduit rejoins the plating recirculation loop at a point after the electrolyte spills over the weir wall of the electroplating cell, and where the apparatus is configured to provide a substantially constant total electrolyte flow rate leaving the electrolyte reservoir and passing through the return conduit, while simultaneously allowing a variable flow rate of electrolyte delivered to the electroplating cell.

In some embodiments, a bubble sensor may be positioned in the return conduit. In these or other cases, the apparatus may further include a second pump positioned in either the plating recirculation loop or the bypass conduit.

In a further aspect of the embodiments herein, an apparatus for electroplating material onto a substrate is provided, including: an electroplating cell including: a vessel for holding electrolyte; a weir wall positioned at the periphery of the vessel, and a fluid collection trough substantially surrounding the weir wall, such that during electroplating, electrolyte flows into the vessel, over the weir wall and into the fluid collection trough; an electrolyte reservoir; a return conduit for delivering electrolyte from the fluid collection trough to the electrolyte reservoir; a plating recirculation loop including the electrolyte reservoir, a pump, the electroplating cell, and the return conduit; a level sensor for sensing the level of fluid in the fluid collection trough; a drain valve positioned in the return conduit; and a drain controller that controls a position of the drain valve based on input from the level sensor, where the drain controller operates to ensure that an electrolyte level in the fluid collection trough does not drop below a target electrolyte level to thereby ensure that substantially no gas enters the return conduit.

In another aspect of the disclosed embodiments, an apparatus for electroplating materials onto substrates is provided, including: an electroplating cell including: a vessel for holding electrolyte; a weir wall positioned at the periphery of the vessel; and a fluid collection trough substantially surrounding the weir wall, such that during electroplating, electrolyte flows into the vessel, over the weir wall and into the fluid collection trough; an electrolyte reservoir; a return conduit for delivering electrolyte from the fluid collection trough to the electrolyte reservoir; a plating recirculation loop including the electrolyte reservoir, a pump, the electroplating cell and the return conduit; a flow meter for sensing the flow rate of electrolyte through the apparatus; a drain valve positioned in the return conduit; and a drain controller that controls a position of the drain valve based on input from the flow meter, where the drain controller operates to ensure that an electrolyte level in the fluid collection trough does not drop below a target electrolyte level to thereby ensure that substantially no gas enters the return conduit.

These and other features of the disclosed embodiments will be described in more detail below with reference to the associated drawings.

DETAILED DESCRIPTION

Introduction

Figure 1:
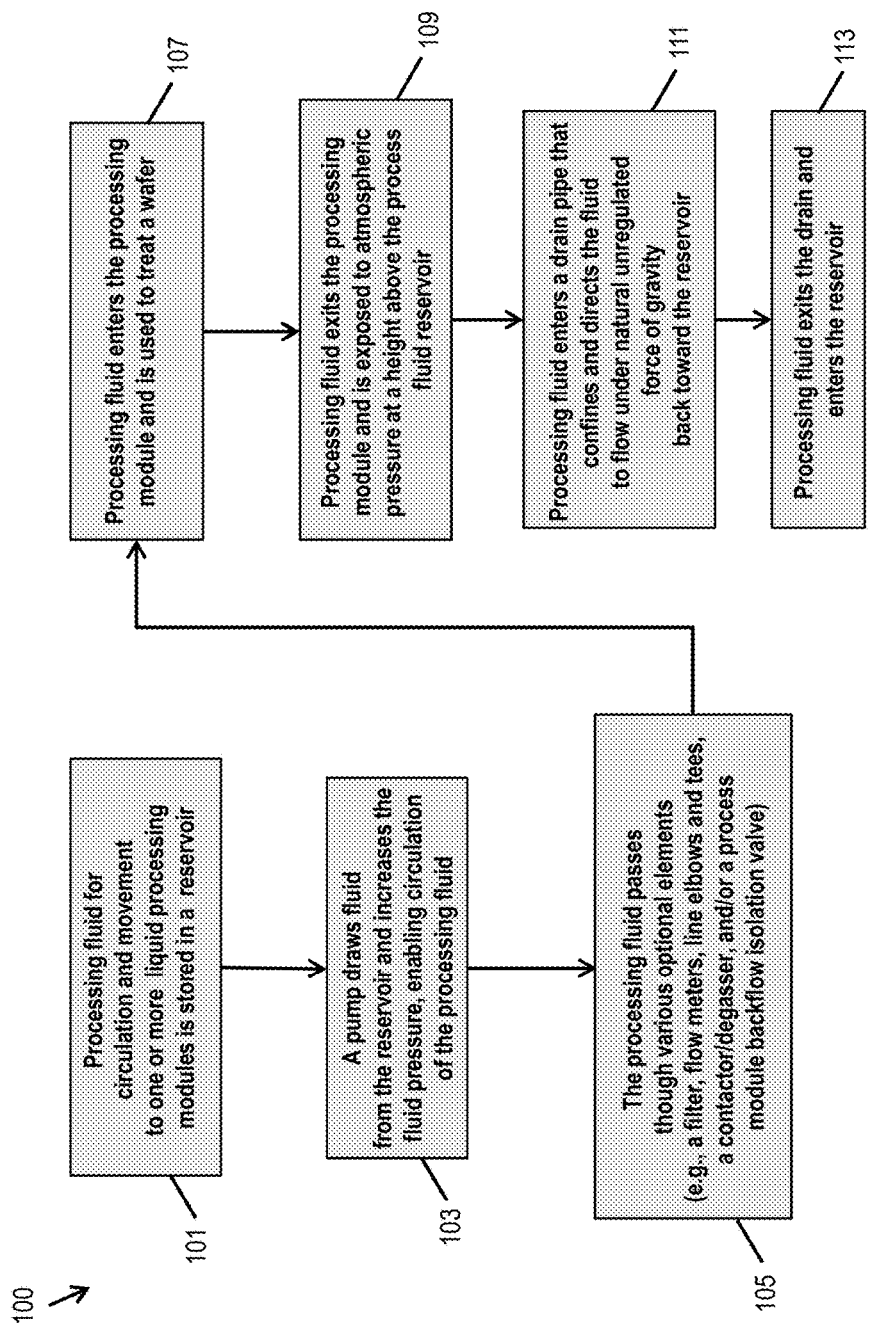
FIG. 1 is a flow chart describing a prior art processing sequence that is known to lead to cell related failures from bubbles, foaming, and dissolved air in the electrolyte.

In this application, the terms "semiconductor wafer," "wafer," "substrate," "wafer substrate," and "partially fabricated integrated circuit" are used interchangeably. One of ordinary skill in the art would understand that the term "partially fabricated integrated circuit" can refer to a silicon wafer during any of many stages of integrated circuit fabrication thereon. The following detailed description assumes the invention is implemented on a wafer. A wafer or substrate used in the semiconductor device industry typically has a diameter of 200 mm, or 300 mm, or 450 mm. However, the invention is not so limited. The work piece may be of various shapes, sizes, and materials. In addition to semiconductor wafers, other work pieces that may take advantage of this invention include various articles such as printed circuit boards and the like.

The embodiments disclosed herein are not limited to any particular wet processing method (e.g. electroplating, wet etching, wet cleaning, etc.), or to any particular chemical or family of chemicals, but rather, are generally related to methods that one of ordinary skill in the art would recognize as presenting similar issues requiring a similar solution. While the descriptions in this disclosure are written in the context of an electroplating method for plating on silicon wafers, the invention is not so limited.

Typically, fluids are pumped from a plating solution reservoir to a plating cell or module during an electroplating application. This helps provide circulation of fluids, convection, temperature uniformity, and the like. The flow rate into the process chamber is often controlled by regulating the RPM or power to a pump, and modulating the response to a control set point via a flow measuring device (e.g., a flow meter or pressure sensor) in the fluid delivery conduit.

To promote the fabrication of defect-free products, the formation of bubbles in the electrolyte should be avoided or minimized. Where bubbles are present in an electrolyte delivered to a processing module, they may stick to the surface of a substrate, thereby masking the substrate, and preventing plating from occurring in these regions. Further, many plating cells are designed to maintain particular deposition rates though the control of electrolyte flow and electric fields surrounding a workpiece. The formation and/or trapping of bubbles or foam within the cell can have deleterious effects on the desired function of the cell.

Examples of general processing applications where liquids are employed and bubbles or foam may form include, but are not limited to, electroplating, electroless plating, chemical mechanical polishing, electrolytic polishing, chemical and electrochemical etching, spin on coating, and wafer rinsing and cleaning. In many of these applications, liquid stored in a reservoir is transferred into a pump, for example, where it may then pass through various elements such as a filter, gas contactor, degasser, valves and/or heaters on its way to a liquid wafer processing area/module.

The processing module may be completely or partially open to the air or to a gas phase controlled atmosphere (e.g., an atmosphere of nitrogen, ammonia, helium, neon, argon, hydrogen or a mixture of these materials). The amount of fluid stored in the processing module or cell at a given time is therefore only a portion of the fluid in the entire flow loop. This fluid is mixed and exchanged with that of the reservoir over time. The amount of fluid in the reservoir may be a large fraction (e.g., 80%) or a small faction (e.g., 10%) of the entire fluid in the circulation loop. New fluid may be added and extracted from the reservoir and circulation loop from time to time as part of a bleed and feed operation, which is used in part to control the physical and chemical properties of the reactants such that they are maintained within their target ranges.

The use of this reservoir/module architecture has several possible advantages, such as allowing the multi-pass use of the fluids, reducing the time constant for the fluid degradation associated with charge or temperature or wafer exposure (thus making the process more easily controllable), and more accurate temperature control, to name a few.

In some embodiments, there is an air/gas interface both in a fluid storage reservoir and in a processing module. In certain cases, movement of fluid from one sub-element container (e.g., a plating module) to another (e.g., a plating bath reservoir) occurs via an open or mixed phase connection or a series of connections having breaks in therein. For example, the conduits connecting the two containers may either be incompletely flooded, or the fluid break may exit at one or more locations during the transfer between the containers.

In the semiconductor industry, fluids may be transferred from a reservoir to a processing module under a controlled flow operation (e.g., using a regulated pump with feedback control of the pumping speed or power from a flow meter). However, the return flow from the processing module to the reservoir is commonly open and "naturally" regulated, meaning that the process is largely a gravity-driven return with the flow out of a process module drain modulated by certain conditions. These conditions may include the fluid level in the processing cell, the drain pipe fractional utilization, the velocity, and the formation of a flowing air/liquid mixed phase returning fluid. These conditions may allow the flow rate out of the processing module to quickly match the rate of the fluid flow into the processing module. This simple natural regulated return approach avoids the complication and cost of more complex matched flow approaches.

FIG. 1 presents a flowchart for a method of circulating fluid in a processing system utilizing a liquid recirculation loop, as has been used previously. The method of FIG. 1 may occur on a system similar to that shown in FIGS. 2A and 2B, which are further described below. The method 100 begins at block 101, where processing fluid for circulation and movement to one or more liquid processing modules is stored in a reservoir. Next, at block 103, a pump draws fluid from the reservoir, thereby increasing the fluid pressure and enabling circulation of the processing fluid. At block 105, the processing fluid passes through various optional elements that may be included in the fluid line between the reservoir and the processing module. These optional elements may include, for example, a filter, a flow meter, a contactor/degasser, line elbows and tees, and/or a process module backflow isolation valve. Next, the processing fluid enters the processing module where it is used to treat a wafer at block 107. Many different types of treatments may occur during this operation, depending on the function of the processing module (e.g., deposition, etching, etc.). At block 109, the processing fluid exits the processing module and is exposed to atmospheric pressure at a height above the process fluid reservoir. After being exposed to atmospheric pressure, the processing fluid enters a drain pipe that confines and directs the processing fluid to flow under the force of gravity in an unregulated manner back toward the reservoir at block 111. Next, at block 113, the processing fluid exits the drain and enters the reservoir.

As mentioned, the unregulated natural return approach has been used to avoid more complex approaches. In these more complicated methods, a return flow rate out of a plating module may be regulated to closely match an incoming flow rate into a plating module. This matching may be accomplished using an electronic or pneumatically controlled and variable flow valve with sensors such as flow meters and/or level controlling sensors. However, even a small imbalance between the flow rate of the stream entering the processing module and the flow rate of the stream exiting the processing module and feeding the reservoir may cause the liquid to slowly transfer from either the reservoir to the processing module, or from the processing module to the reservoir (thus draining and possibly emptying the processing module of fluid).

Figure 2A:
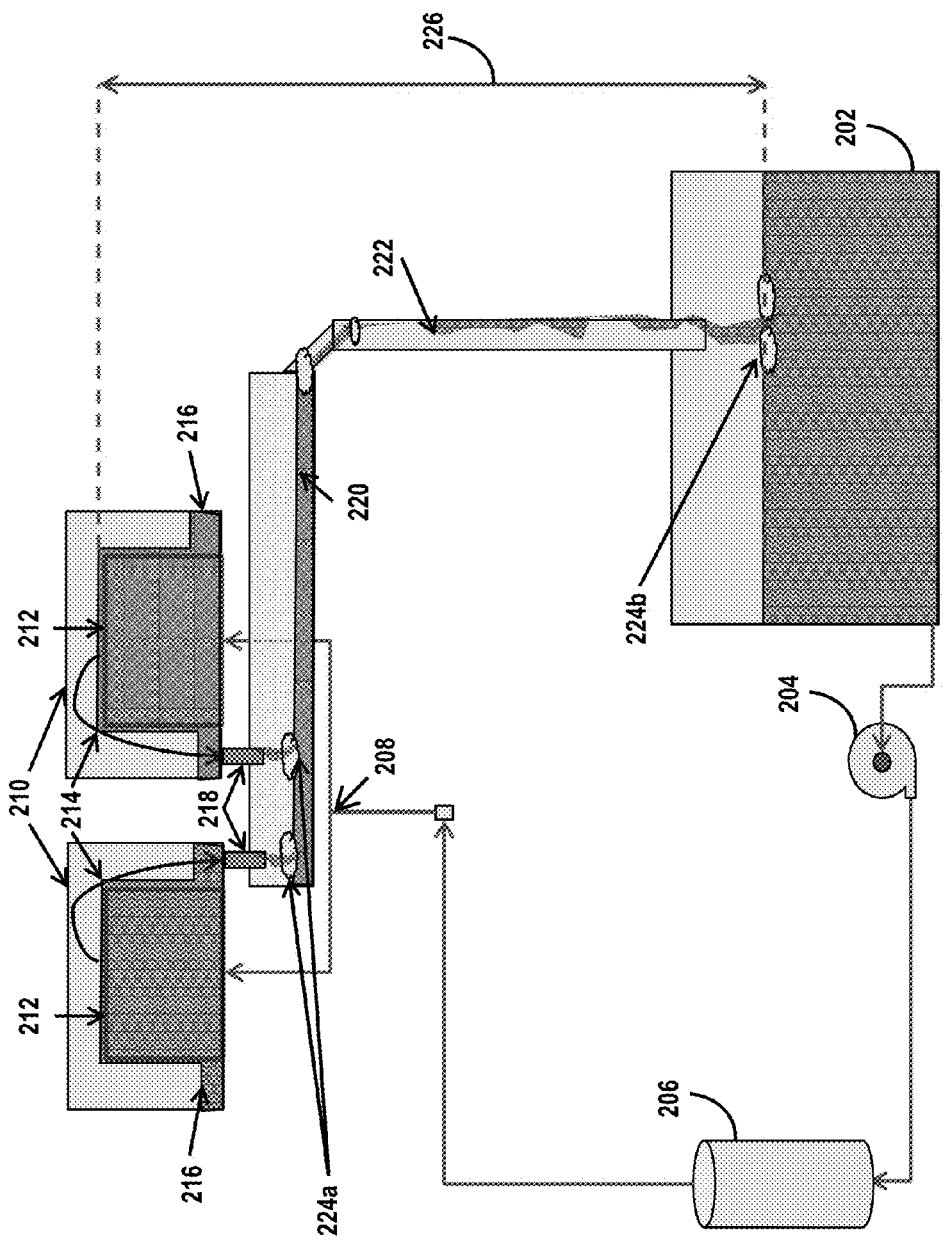
FIG. 2A shows an example of a conventional electroplating apparatus having multiple plating cells in fluid communication with an electrolyte reservoir.

In contrast, these undesirable fluid buildups have been avoided by allowing the resistance to flow of the returning fluid to be "naturally" determined and regulated, as shown in FIG. 2A. As mentioned above in relation to FIG. 1, processing fluid is held in a reservoir 202. In contrast to the process described in FIG. 1, FIG. 2A shows two separate processing modules. However, the same basic process is used in both cases. From the reservoir 202, the processing fluid is transferred through a pump 204, which drives the fluid through a filter 206 before it is split at a tee 208. Each outlet of the tee 208 feeds to an individual processing module 210. In the embodiment of FIG. 2A, the processing modules 210 are fountain-type plating cells. However, various other types of processing modules that utilize liquid processing fluids may also be used. The processing fluid is fed to a primary fluid containment area 212, which is where plating occurs. The fluid then spills over a weir wall 214 of the primary fluid containment area 212, and into a cell-level trough 216. The cell-level troughs 216 are annularly shaped and surround the primary fluid containment areas 212. From the cell-level troughs 216, the processing fluid flows down a first drain pipe 218 and into a common trough 220. The flow from each processing module 210 drains into the common trough 220. From the common trough 220, the processing fluid enters a return conduit 222, which returns the fluid to the reservoir 202. Other features to note in FIG. 2A are mixing points 224a and 224b, where processing fluid passes through a liquid-gas interface. At these mixing points 224a and 224b, gas is likely to be undesirably incorporated/mixed into the liquid processing fluid, causing the formation of bubbles, microbubbles, foam, and rapid oxygenation of the fluid. Gas incorporation is likely to be a greater problem at mixing point 224b, as the fluid entering the reservoir 202 at this point is likely to have a higher downward velocity than fluid entering the common trough 220 at mixing point 224a. Next, the drop distance 226 is noted, and represents the distance 226 between the fluid level of the primary fluid containment area 212 in a processing module 210, and the fluid level of the reservoir 202. In certain descriptions herein, a drop distance 226 of about 5 feet is used as an example.

The fluid control used in FIG. 2A may be accomplished by obtaining a natural balance between the vertical fluid pressure head and the pressure drop associated with fluid flow acceleration, channel constrictions, elbows, constraints, and various viscous dissipation in the tubes. Where this is the case, the flow out of a processing module and into a reservoir rapidly becomes equal to the flow rate into the module. Furthermore, the flow out of the module can quickly accommodate any change in operating conditions. Generally the "natural return" approach includes using a return conduit that is sized to accommodate a flow rate greater than the maximum target system flow rate, and allowing relatively minor increases in fluid backup at the return conduit inlet.

However, while this natural return oversizing approach guarantees a trouble free flow return to a reservoir over a large range of flow rates, it fundamentally ensures that the flow in the return conduit is a mixture of air and liquid. The air is often present in the form of bubbles that flow downwards with the liquid stream in at least a portion of the return conduit. The bubbles are present in any case where the flow out of the processing module is less than the maximum flow permitted by the oversized return conduit. Since the return conduit is designed to permit a greater flow than is typically seen, the formation of bubbles in the return conduit is very common.

In situations where the vertical drop between the module and reservoir is large compared to the range of process module fluid levels that can be accommodated (i.e., fluid levels that can be accommodated in the plating cell itself), perfectly matched bubble free natural return flow occurs under a very limited range of flow rates/conditions where the module drain port is backed up. An outlet/drain port may be considered backed up where there is sufficient liquid above the drain such that substantially no gas passes through the drain with the flowing liquid. Typically, the minimum back up height to achieve this condition is approximately equal to the diameter of the drain pipe (e.g., a fluid height that is at least about 75% of the diameter of the drain pipe). Those very limited back up conditions correspond to cases where the flow resistance in the return path in a completely full and air/bubble free state perfectly matches the driving pressure head available for draining flow.

If the flow resistance is fixed, such as when there are no variable return control feedback valves, then only two factors can increase the flow rate in the drain: 1) an increase in the fluid height and associated pressure head, and 2) a reduction in the relative amount of gas held in the line. As the flow rate of liquid increases at a fixed vertical drop drain in a pipe, the amount of gas, as a percent of the fluid in the pipe, decreases until eventually the entire pipe is filled with liquid and free of gas. To further increase the flow at that point, the liquid drop distance may be increased. When the vertical drop from the cell to the reservoir is large and fixed relative to a small variability in the change in pressure head that can come from a fluid height increase in the cell, the range of air-free balanced flow is small. This small processing window associated with a large drop and small pressure head variability conditions is common to liquid handling wafer processing equipment because the process module sizes are small relative to the vertical drop to the storage reservoir, but become increasingly small for vertical (stacked) module tools.

As a particular example, a fountain type plating cell receives injected flow from a reservoir into an inner cavity of the cell. From here, fluid gently flows over a weir positioned at the outer diameter of the inner cavity into an outer annular collection chamber (as a "fountain" would flow over into a peripheral pool). The overflow occurs under low velocity laminar conditions, and generally no bubbles or turbulence are created in part due to the large diameter of the inner cavity (e.g., the inner cavity of a module for processing 300 mm diameter substrates may have a diameter that is about 380 mm). A typical drop from the weir wall to the annular collection chamber/trough may be between about 4-6 inches in some cases. The fluid is collected in the outer collection chamber, and directed to a drain that returns the processing fluid to a plating reservoir or "plating bath"

located below the cell. This fluid transfer may occur via a drain pipe between the cell's outer collection chamber and the reservoir. The drain (sometimes referred to as a return conduit) may include an intermediate trough where electrolyte accumulates after passing from an annular collection chamber/trough and before passing to the reservoir. This intermediate trough may be used to accumulate electrolyte from multiple plating cells. In this case, the drain/return conduit may include more than one individual pipe, for example, the drain/return conduit may include a conduit between the annular collection chamber/trough of each electroplating cell and the intermediate trough, as well as a conduit between the intermediate trough and the reservoir. The conduits between the annular collection troughs of the electroplating cells and the intermediate trough may be between about 3-5 inches in some embodiments. The conduit between the intermediate trough and the electrolyte reservoir may be between about 3-5 feet.

The outer collection chamber and drain can be sized such that fluid will not overflow the outer collection chamber at any flow rate less than a maximum system deliverable flow. The maximum flow through the drain is determined by the overall flow resistance for the return in the conduits and any other restrictions (valves, orifice, elbows, tees etc.), under conditions where the return path is completely full of liquid and free of gas, and the maximum pressure driving force available in the return path. The natural available pressure driving force for the return flow is the elevation pressure, or pressure head, and is equal to the product of the density of the fluid times the acceleration of gravity times the height of the processing module above the point where it enters the reservoir below.

At lower flow rates, the fluid level inside the processing module is more complex to predict because flow is a mixture of gas and liquid phases due to the presence of bubbles. However, the net return flow resistance is larger than the maximum single phase (liquid) flow case because while the total flow is less, the available pressure driving force is the same. The additional resistance at low flow is largely attributable to the higher local velocities of the fluid than would occur if the drain pipe were completely full of liquids. The air/liquid fluid mixing creates a mixed phase expanded media, which increases turbulence and causes the velocity of liquid moving in the pipe to be greater than it would be if the pipe were completely full of liquid.

One problem with large vertical drop natural flows arises because the natural return pressure drop can be quite large, and because uncontrolled mixed phase flow can quickly accelerate to very large velocities in the relatively large tube designed to accommodate the highest end of the flow requirement. For example, for every foot of vertical drop, the pressure drop in a return conduit containing water is about 0.43 psi. Thus, a 5 foot drop has a driving pressure of over about 2.15 psi. In this setup, 50 liters per minute can enter (0.35 psi drop) and pass through 5 feet of a 0.725" diameter pipe (1.19 psi) and expand/exit into a bath (0.7 psi) with approximately this available height and pressure (2.24 psi). However, the same construct flowing at 25 liters per minute requires a pressure drop of about 0.66 psi (about 3.3 times lower), and a flow rate of about 5 liters per minute requires a pressure drop less than 0.05 psi (about 43 times lower).

Consider the difficulty of enabling a gas-free, mechanically regulated level regulated and driven return conduit having returning flow over the entire range of flow rates from about 5-50 liters per minute. The total pressure drop for all situations must be equal the available pressure head, namely 2.15 psi for this example. Also, the conduit must be large enough, and the sum of the resistances (e.g., tube, entrances, bends, constrictions, and exits) must be small enough to accommodate the largest flow (50 lpm) at that same 2.15 psi. Using a 1 inch OD pipe with an ID of 0.875" might safely prevent overflow in any flow controlling apparatus or mechanism that is "wide open" i.e., where the mechanism, in its wide open state, offers negligible additional resistance.

In contrast, at the lowest flow rate of 5 lpm, the pressure drop in the return conduit and restrictions is negligible, so nearly all of the 2.15 psi pressure drop must reside in a nearly closed and highly restrictive control valve mechanism. If the control valve simply closes the entire area of the 0.875" diameter tube (which has a cross sectional area of 0.6 in$^2$), the force acting on a fluid level feedback mechanically regulating valve is considerable, about (2.15 pounds/in$^2$)* (0.6 in$^2$)~1.3 pounds of force. At least that level of mechanical force must be used to open the valve if the flow increases to a greater flow rate and the level starts to raise. One goal is that at all conditions of flow, gas should be prevented from being sucked into the control valve by a vortex or similar phenomena that may be created above the valve and return conduit inlet. Otherwise, gas may transfer though the return conduit to the reservoir below at high velocity.

In another example illustrating the small range of possible flows that an unregulated drain can maintain at gas-free conditions, the classical fixed lumped system flow factor $C_v$ is used. This example assumes that the characteristics of a 10 gallons per minute (gpm) liquid drain return flow (about 37.8 liters per minute) can be approximated by the classical fixed lumped system flow factor $C_v$. In this case, the flow factor accounts for the resistance contributions of the valve, and also the lines, entrance and exit resistances. The flow though the drain would then be $$F = C_v \sqrt{\frac{\Delta P}{SG}} \qquad \text{Equation 1}$$

If the vertical drop from the cell to the bath is nominally about 5 feet (60 inches), the head pressure will be about 2.15 psi, and for water, SG=1.0. Thus, the Cv for the system will be 6.82 gpm psi–½. Assuming that a range of about 3 inches of head change in the cell can be accommodated to cover the drain without overflowing the cell's outer collection chamber, a flow range of about 10.00+/−0.12 gpm (38.80+/−0.46 lpm), or a variable flow range of only about +/−1.2% can be accommodated by changes in the pressure driving force. A means of regulating the resistance other than having the liquid level rise in the cell is therefore required.

To summarize the problem discussed above, a more robust method of regulating resistance in the return conduit is needed because conventional means are insufficient to accommodate changes in flow that often occur during processing. For instance, where the flow through the processing module is too high, the processing module may overflow. Conversely, where the flow through the processing module is too low, gas may be pulled into the return conduit along with the returning electrolyte, which undesirably introduces bubbles/foam into the electrolyte passing through the return conduit and back to a reservoir. Therefore, it is desired to enable a small form factor passive or active device, the combination of device elements being dependable, robust, low cost, and automatically regulating, that can avoid the aeration of fluid in a processing module return conduit over a range of flow rates, that can respond rapidly to changes in the flow rates, and that allow a user the flexibility of employing multiple flow processing conditions. A passive device may be a mechanical device, for example, while an active device may include electronically controlled valves used in combination with level sensors. The device may be self-regulating to avoid introduction of air into the return conduit. Flexibility of processing conditions is also important, as in some cases the flow processing conditions may change over the course of depositing film on a single substrate, or during the course of plating several substrates sequentially. Advantages of such a device include elimination of various processing problems related to the introduction of gas into the return conduit, including certain processing defects, excessive oxygenation of an electrolyte storage reservoir, and instability related to the presence of gas/bubbles/foam in the electrolyte.

One example of a type of problem that may arise due to the presence of bubbles in electrolyte relates to the use of a channeled ionically resistive plate in an electroplating cell. These types of plates allow for highly uniform films to be deposited on wafers having a very thin seed layer, a situation that is associated with the most challenging damascene wiring dimensions of today's integrated circuits. Channeled ionically resistive plates are sometimes also referred to as channeled ionically resistive elements, high resistance virtual anodes, and other similar terms. These plates are further discussed and described in the following U.S. Patents and Patent Applications, each of which is herein incorporated by reference in its entirety: U.S. Pat. No. 7,622,024, filed Jan. 20, 2005, and titled "HIGH RESISTANCE IONIC CURRENT SOURCE"; U.S. Pat. No. 7,967,969, filed Oct. 13, 2009, and titled "METHOD OF ELECTROPLATING USING A HIGH RESISTANCE IONIC CURRENT SOURCE"; U.S. Pat. No. 8,308,931, filed Nov. 7, 2008, and titled "METHOD AND APPARATUS FOR ELECTROPLATING"; U.S. Pat. No. 8,475,636, filed Jun. 9, 2009, and titled "METHOD AND APPARATUS FOR ELECTROPLATING"; U.S. Pat. No. 8,475,644, filed Oct. 26, 2009, and titled "METHOD AND APPARATUS FOR ELECTROPLATING"; U.S. patent application Ser. No. 13/907,265, filed May 31, 2013, and titled "METHOD AND APPARATUS FOR ELECTROPLATING"; and U.S. patent application Ser. No. 13/108,881, filed May 16, 2011, and titled "METHOD AND APPARATUS FOR FILLING INTERCONNECT STRUCTURES."

The large and anisotropic ionic resistance of the high resistance plate arises due to the design of the plate, which consists of a very large number (e.g., several thousand in some embodiments) of very small (e.g., less than 0.03 inches in diameter in some embodiments) individual and non-communicating through holes in a dielectric plate, which is about 0.1-1 inch thick. Liquid can easily flow though the ionically resistive plate holes, but where there is gas present in the electrolyte, the gas may coalesce into bubbles that are larger than the holes in the plate. If this occurs, the bubbles can become trapped below the plate, thereby blocking the flow of liquid and therefore ionic current through the plate. It can require a substantial amount of energy and effort to mechanically remove such bubbles. As such, there is great value in preventing the formation of these bubbles in the first place. Not only does this hole blockage increase the average resistance of the plate, but any non-uniform distribution of blocked holes can alter the thickness distribution in the film plated on a substrate. Therefore, formation of bubbles below the plate should be avoided. This through hole blockage is just one of many examples of how bubbles or foam can negatively impact the performance of a plating process on a workpiece.

As mentioned above, for practical reasons related to safety, weight, space, ergonomics, etc., a plating module may reside several feet above a main volume/reservoir of plating bath fluid. During a plating process, plating fluid may be circulated between the plating module(s) and the reservoir. As the industry advances, it is becoming more common to use multi-level processing apparatus, for example a multi-station plating apparatus that has two "floors" arranged in a stacked orientation. This change is driven by the need to efficiently use space within a semiconductor fabrication facility.

However, the use of stacked processing apparatus introduces additional problems related to the transfer of fluid between different parts of the apparatus, especially the transfer of fluid between containers or other elements that are positioned at different vertical heights. These fluid transfer problems include, but are not limited to, the need for larger pumping pressures and the associated potential for dissolving gas into the electrolyte pumped up to a higher level processing module, the subsequent release of gas and nucleation of bubbles from a stream having a supersaturated dissolved gas condition upon reaching the higher level processing module, the uncontrolled or poorly controlled mixing of air and electrolyte where the electrolyte returns to a lower level processing module and/or reservoir, and the formation of foam and microbubbles in the reservoir which can dissolve as they are injected into the pump to repeat the fluidic cycle.

An alternative approach to pumping fluids from ground level to a cell level would be to have reserve (reservoir) fluid present and stored at each level. However, there are at least three problems with this approach. The first problem is that there is a very significant level of operational hazard to operators if highly acidic, hot, corrosive fluids are vertically positioned above their bodies. Large quantities of potentially hazardous chemicals with significant amounts of stored potential energy held in such a manner would require an increased need for containment and safety precautions related to the much larger volumes. A second problem is the need to have both a feeding and returning set of pumping control hardware if the process module and reservoir are at the same height/energy level. A third issue relates to the mechanical stability and structural integrity of a processing tool. 100 liters (about 25 gallons) of plating solution in a reservoir can weigh about 115 kg (250 lbs). Maintaining this amount of electrolyte at the same height as an elevated plating module requires a processing tool having substantial structural strength. Other ancillary heavy equipment would also need to be on the elevated level as well (e.g., pumps, filters, heat exchangers, contactors). Having all of these heavy elements 6 feet or more off the floor requires tool frame designs that can support the structure from bending, tilting and collapse, adding both weight and cost to the tool design. Lastly, manual pouring of fluids into or removing from the elevated reservoir(s), as well as the general maintenance of the reservoirs, is very difficult and dangerous, adding a level of operational complexity otherwise not necessarily required. For these practical reasons, keeping fluid processing elements like reservoirs and pumps at ground level is extremely beneficial.

Plating and other processes where liquids are transferred into and out of a processing module do not always run at a single static flow rate. It is often desirable to modulate the flow rate to the cell during the process of plating an individual substrate, or between substrates when processing them in a sequence, for example where different types of substrates are processed under different fluidic conditions. Processes that have a significant diffusion/convection dependency will often require flow rate modifications and control during processing of an individual substrate. An example of such a process is alloy electrolytic plating (e.g., SnAg solder bump alloy plating), where one or more components are plated under conditions where mass transfer is actively controlled. Rapid changes in flow (without the benefit of the present embodiments) at a minimum require some time for a bubble-free condition to be reestablish, and in many cases it is not possible to reestablish a bubble-free condition, even after a long period of time has passed since the change in flow occurred. A method and apparatus that enables the rapid change in flow rates without introduction of bubbles or formation of foam at any condition is therefore desired.

In certain conventional methods of circulating processing fluid, the fluid returning to a reservoir flows in a fairly uncontrolled fashion. One objective of certain disclosed embodiments is to reduce the local flow velocity and bubble-creating turbulence of fluid in a return conduit common in unregulated return flow.

For a given volumetric flow rate of an incompressible fluid, the local velocity is equal to the volumetric flow rate divided by the local cross sectional area of flow. Therefore, increasing the area for flow will decrease the velocity, and therefore the momentum and energy, of the fluid. Under the force of gravity, the fluid acceleration is limited by viscous and/or form factor induced factors. For a tube of a large size with fluid returning under natural gravity-driven conditions, the fluid velocity is only weakly limited by the viscous surface drag forces.

Figure 2B:
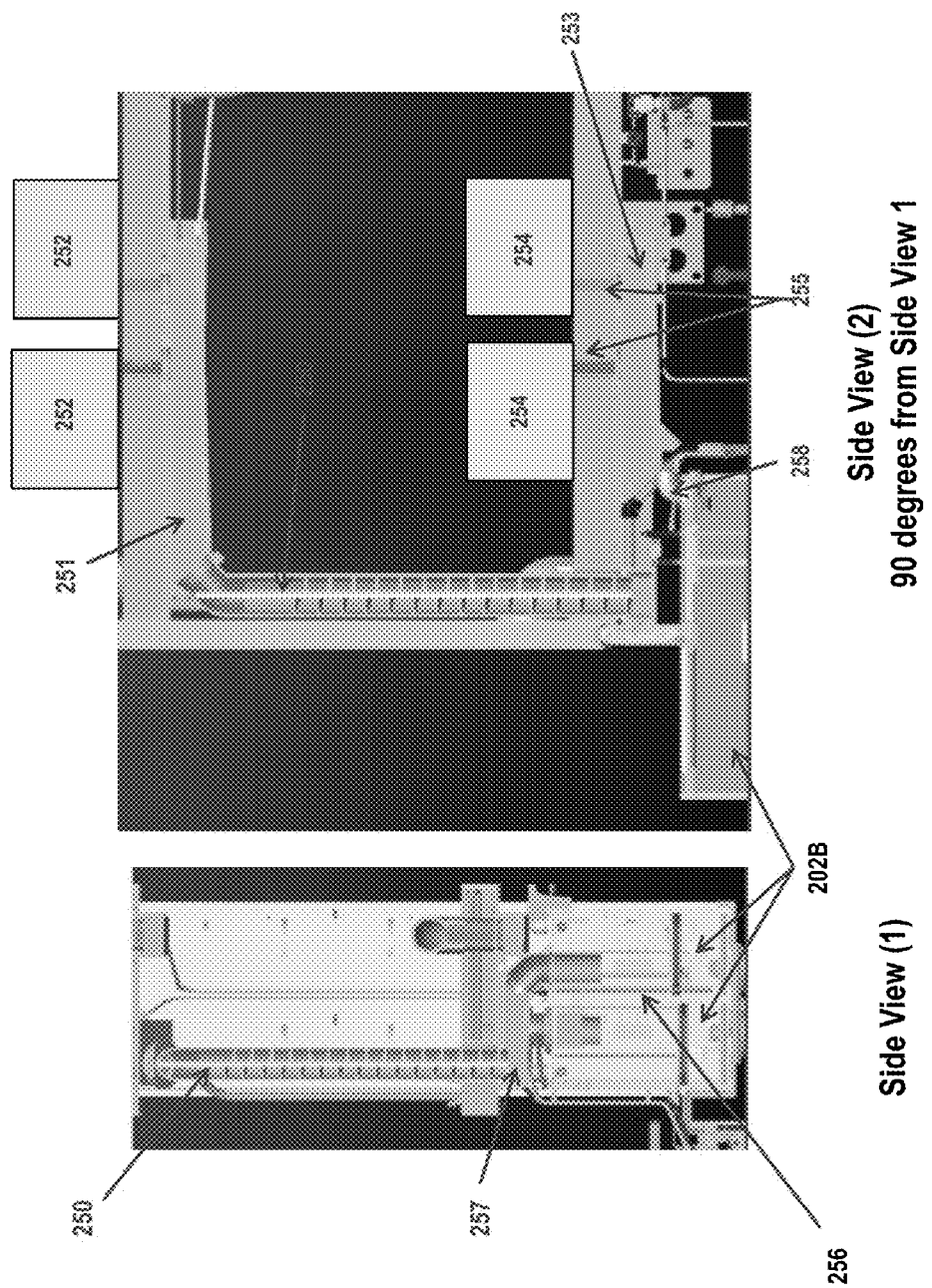
FIG. 2B shows an additional example of a conventional electroplating apparatus having an Archimedes screw.

The drag force acting on fluid in a transfer conduit may be increased by increasing the amount of interfacial area of the conduit (requiring a very large tube with a very thin film), or by including a packing material within the conduit (e.g., a packed bed), where the fluid cascades down the tower of packing material in a number of small steps. The limitation of this approach in controlling the velocity and increasing viscous resistance of the fluid is the inability to run a process over a large range of air-free carrying conditions. At too high a flow rate, the gas phase becomes encapsulated in fluid, and air bubbles start to become drawn down with the liquid in the tower. An alternative approach shown in FIG. 2B employs an Archimedes screw 250 and a series of conduits, which attempts to create a long flow path down a circulating winding slide to a lower level. FIG. 2B shows two views of the same embodiment from two different perspectives. The Archimedes screw may have more than one inlet in order to allow electrolyte to enter the screw from more than one level (e.g., from each of two levels in a stacked "duet" electroplating cell architecture). In this case, more than one intermediate fluid collection trough is used, an upper trough 251 for collecting fluid from the upper electroplating cells 252, and a lower trough 253 for collecting fluid from the lower electroplating cells 254. Transfer conduits 255 may be used to transfer fluid from the electroplating cells 252 and 254 to the troughs 251 and 253. As shown in FIG. 2B, a split electrolyte reservoir 202B may be used, where the reservoir is split into two portions by reservoir wall 256. The fluid exits the Archimedes screw at outlet 257. In some cases, the fluid from the lower trough 253 may pass directly into an electrolyte reservoir 202B without entering the Archimedes screw, instead passing through a simple connection such as an elbow 258 between the lower trough 253 and the reservoir 202B.

One problem with this approach is the limited utility and functionality over a large range of possible flow rates. In practice, entrance of fluid into the screw must be carefully controlled or else massive turbulence may occur. If this is the case, the fluid in the screw is often moving under high velocity turbulent conditions with a substantial amount of angular momentum, after which it must exit into a non-moving media at the surface, causing substantial sheering. As the flow rate increases, both the film thickness in the slide and the average velocity of the fluid increase, while the viscous draw decreases. At the exit of the Archimedes screw there still exists an air/liquid interface, with the fluid exiting the screw sliding into the reservoir fluid at high velocity, creating bubbles or foam. Therefore, this classical method is generally inadequate to meet the goals of the present embodiments, and a better method of avoiding the formation of bubbles and regulating the gravity return of fluid over a large range of flow rates is desired.

It was observed that the formation of bubbles can be substantially prevented for a particular flow rate condition if the fluid within the return conduit is completely full of liquid and devoid of gas/air. This condition is achievable by having a liquid layer above and below the return conduit inlet and outlet at all times.

In some embodiments, the return of fluid from one or more processing modules at a particular level back to the reservoir is performed in more than one step. An intermediate air break may be created, for example, with a level-specific draining-fluid collection trough that combines all fluid drains for a particular level before passing down a single drain pipe to a ground floor reservoir. This level-specific collection trough may be considered an intermediate trough. For example, in a multi-tool plating apparatus where four plating modules are included in each of two levels (the levels stacked on top of one another), an upper return fluid collection trough (i.e., a first intermediate trough) may be used to combine all the fluid exiting the four plating modules on the upper level, and a lower return fluid collection trough (i.e., a second intermediate trough) may be used to combine all the fluid exiting the four plating modules on the lower level. The first intermediate trough may drain into the second intermediate trough, or they may independently drain into the electrolyte reservoirs through separate pipes.

The vertical drop distance from a plating cell (e.g., the upper edge of a weir wall) to an annular fluid collection trough or to an intermediate trough should be small (e.g., less than about 15 cm), and the area of weir overflow/annular collection trough should be large (e.g., the weir should have a diameter of about 20 cm or greater, in order to avoid substantial turbulence and bubble/foam formation). In some cases, the vertical distance between the upper edge of a fluid overflow weir of a plating module and an annular fluid collection trough or an intermediate trough is between about 3-20 cm, for example between about 6-10 cm. In certain cases, the distance may be less than about 7 cm. The diameter of the annular collection trough may be between about 15-50 cm, depending on the scale of the electroplating cell. In some cases, the diameter of the annular collection trough is between about 22-42 cm.

This design results in laminar low flow velocities and minimal bubble formation at the base of the cell. In some embodiments, a flow restriction device as described herein can be used in the drain from the cell to an intermediate trough. In another embodiment, the drain from the cell to the intermediate trough is restricted by adding a drain restricting device. In certain embodiments, a cell having a drain restrictor in a trough has a process module fluid level sensor, and gas (particularly inert gas such as nitrogen or argon) is fed into the trough via an inlet port to create a positive head pressure against the fluid coming down from the process module and though the cell's drain restrictor. The pressure in the trough may be modulated using a trough control venting valve, which may be set such that the level of fluid in the cell is maintained relative to a target cell fluid height (the target fluid height being sufficient to keep the drain backed up and fluid flowing air-free down the restricted drain line).

In general, the change in driving force (pressure) for the return flow though a completely filled conduit feed from a return cell or trough is quite limited due to space constraints and the need to avoid formation of bubbles in the accumulated fluid in the cell or trough. This implies that the change in driving force, and hence the ability to modulate the return flow rate in a completely filled conduit, is limited by the ratio of the height of the trough to the distance from the base of the conduit in the trough (i.e., the return conduit inlet) to the height of fluid in the reservoir. This ratio is typically quite small. For example, if the trough or cell can contain about 3 inches (0.25 ft) of fluid and the vertical drop from the trough to fluid level in the reservoir is about 5 feet, the range of pressures that act on the fluid with the conduit completely full of liquid is only (0.25 ft)/(5 ft)×100=5% of the nominal pressure. As shown above, the range of resulting flow for such a situation is even smaller than this value (just 1.2%). The nominal flow rate that will flow air-free without overflowing is determined by the balance of pressure drops in the conduit entrance, elbows, orifice, valves, and exits. One can manually modulate the flow resistance to one where the line is just backed up and air is not passing though the conduit by precisely changing the flow resistance using a manually adjustable valve. This allows the flow resistance to be tuned such that the total pressure drop in the return system equals that available due to the vertical drop (5 ft in this example). However, the range of controlled pressure is still small (e.g., only 5% of that set value), and the range of controlled flow is very small (e.g., only about 1.2%). If the flow increases more than this, the fluid will backup and eventually overflow the trough into an air-containing fluid overflow path. Alternatively, if the flow becomes too low, air will be sucked with the returning fluid and foam will result.

Generally, if the velocity of a liquid moving near a gas interface is high, the formation of a large number of small fluid-entrained bubbles and/or foam may result. High velocities often arise from operations where plumbing and containment is limited. Separation of these small bubbles can be very difficult in the small space and volume of the processing and recirculation system. Therefore, there is a general engineering conflict between minimizing the fluid handling footprint and volumes on the one hand, and the avoidance of entrained bubbles on the other hand, particularly when combined with a high bath turnover rate and the use of high flow rates and velocities. For example, if the plating bath volume is 50 liters and the flow rate is 25 lpm, the bath is substantially circulated every 2 minutes. For a common reservoir bath height (e.g., about 1 to 2 ft, the fluid level needed for level control and to avoid sucking in air from the air/liquid interface at the pump), the average downward velocity in the reservoir can be quite large. This means that even moderately sized bubbles may not be easily separated by waiting for them to rise to the surface, because their upward velocity is exceeded by the downward velocity in the tank. Bubbles that then reach the pump after leaving the reservoir are put under pressure at the upstream side of the pump, which may create a supersaturated solution of gases in the electrolyte (with respect to the solubility at atmospheric pressure). The dissolved gas is released when the pressure decreases, such as when the stream enters the processing module (e.g., plating cell).

Mechanical (Passive) Feedback Fluid Level Drain Rate Regulating Designs

Figure 3:
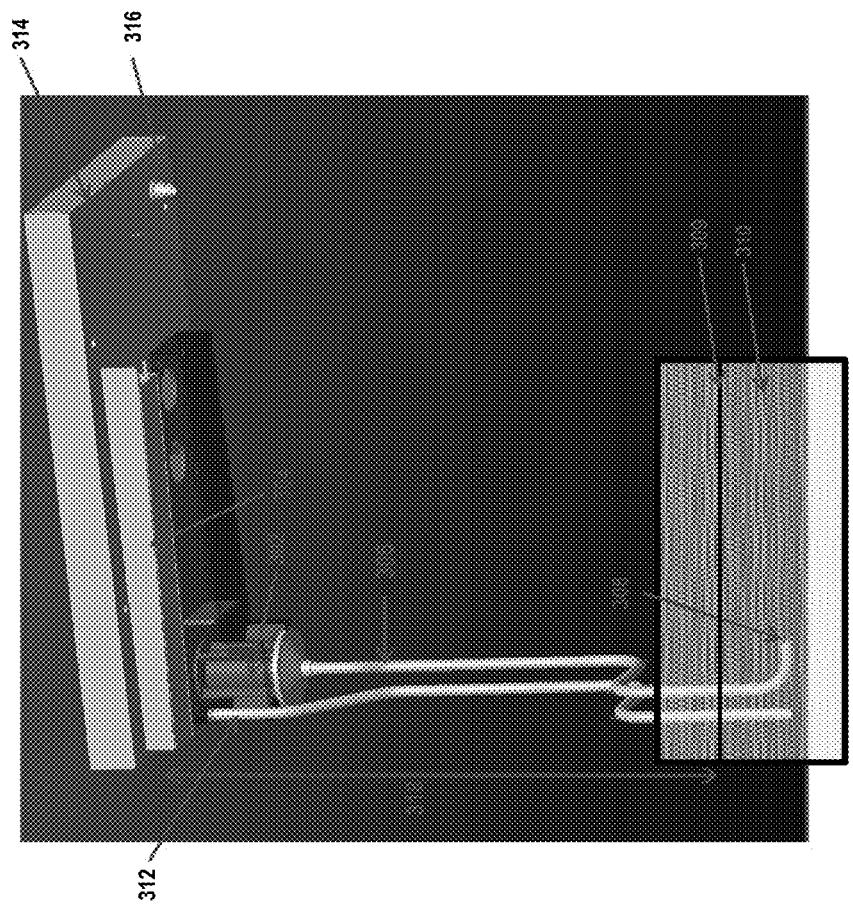
FIG. 3 is a broad picture and overview of a particular disclosed embodiment for reducing the introduction of gas into an electrolyte return conduit using a float and valve assembly.
Figure 4:
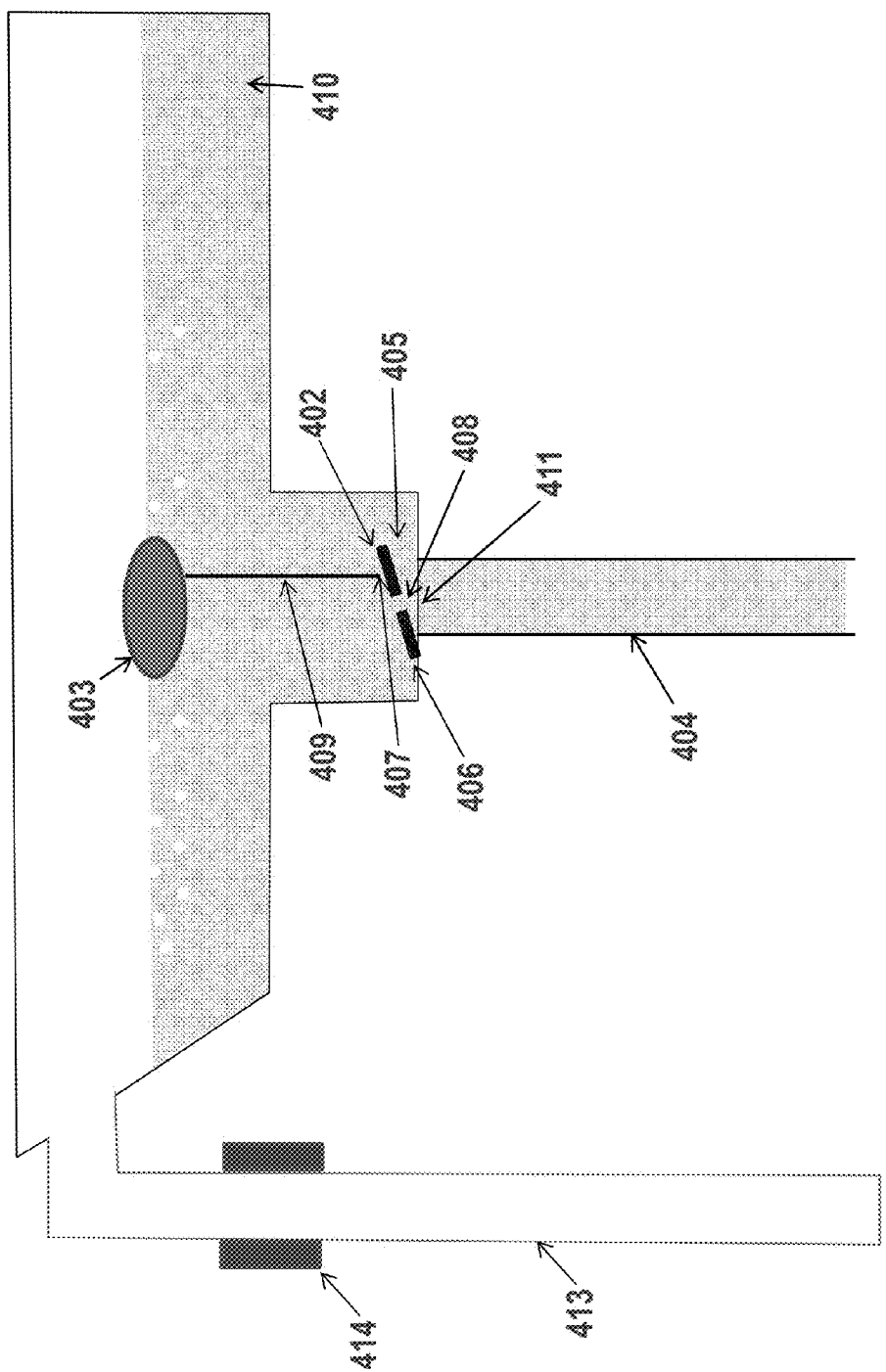
FIG. 4 depicts an embodiment of a trough for controlling flow of liquid from an elevated trough region to a lower reservoir using a valve flap and float to control the opening of a drain pipe as the liquid level in the trough rises.

FIG. 3 is an overview of one embodiment of the invention. An air transfer prevention mechanical control float and valve assembly 302 resides below a return collection trough 304. The fluid in the return conduit 306 is always filled with liquid and free of bubbles and foam (e.g., less than about 1 ppm gas). The outlet 308 of the return conduit 306 is positioned below the level of fluid 309 in the reservoir 310. An emergency overflow line 312 is present on the trough 304, which may accommodate flow rates up to at least the maximum pump output, useful in the highly unlikely event that the valve 302 jams. As shown in FIG. 4 and other embodiments, there may be an overflow sensor (not shown in FIG. 3) on the overflow line, which is used to detect any abnormal return flow events. This may be used to identify if and when a valve becomes blocked. Also not shown in FIG. 3 are the processing modules, which are housed in the cell secondary containment area 314. Only the bottom portion of the cell secondary containment area 314 is shown. Processing fluid may drain from the secondary containment area 314 down into the trough 304 through one or more trough inlets (not shown). Processing fluid may also drain out from the secondary containment area 314 through a secondary containment drain 316. The fluid drop distance 318 is the distance between the fluid level in the trough and the fluid in the reservoir.

The overflow line entrance may be located at the top of the trough so that, in normal operation, little or no fluid passes into the overflow line. One or more sensors (not shown) may be affixed to the return conduit below the control valve. This sensor or sensors may be used to confirm that the valve is not jammed, and the flowing fluid is air-free. The sensor may be an air-sensitive capacitive type of sensor or a through beam laser type sensor, for example. Other types of sensors may be used, as well. The sensor may be used to detect the presence or absence of air in the line and send an alarm in the case of a malfunctioning flow return control valve. In other embodiments where low levels of oxygen are required, an oxygen sensor may be used to detect the concentration of oxygen in the reservoir, return line or feed lines, or other portions of the apparatus where fluid is present. These sensors may be especially useful when used in conjunction with feedback controls, for example where an oxygen regulating device (e.g., a degasser, liquid contactor or nitrogen bubbler) is used to maintain the concentration of oxygen at desired levels based at least in part on readings from one or more concentration sensors.

As mentioned, one reason that the introduction of bubbles/foam into the electrolyte is undesirable is that the presence of oxygen in the electrolyte can have deleterious effects on plating. In some embodiments, the concentration of oxygen in electrolyte is further minimized and controlled by purging oxygen from the electroplating cell, any of the fluid collection troughs, and/or the electrolyte reservoir, for example by flowing a stream of substantially oxygen-free gas (e.g., nitrogen) through these areas of the apparatus. This gas purge helps prevent the incorporation of oxygen into the electrolyte, and can be used in combination with any of the disclosed embodiments.

FIG. 4 shows a simple design offering one possible control scheme using a hinged flap control valve. A flat restrictive valve flap 402 connected to a float 403 by connection 409 may be positioned proximate the return conduit 404. The basic idea behind this design is that the flat restrictive valve flap 402 and float 403 create a variable resistance to flow, such that as the flow rate through a processing module increases, the fluid level in the trough 410 rises, causing the float 403 to rise, which opens the flat restrictive valve flap 402 to create an opening 405 through which liquid may drain. When the restrictive valve flap 402 opens, the resistance to flow decreases, and the flow rate through the return conduit 404 increases. This helps prevent the buildup of fluid in the trough 410 by ensuring that the flow rate through the return conduit 404 is sufficiently high when the flow rate into a processing module (and therefore the fluid level in the trough 410) is relatively high, while also ensuring that the flow rate through the return conduit 404 is sufficiently low, such that substantially no gas enters the return conduit 404, when the flow through a processing module (and therefore the fluid level in the trough 410) is relatively low.

The flat restrictive valve flap 402 may have a first hinge 406 which allows the valve flap 402 to open by rotation about a pivot point at one end. The hinge 406 may be a rubber attachment to the trough base, a mechanical hinge, or another mechanism that allows primarily single axis rotation of the flap. A second hinge 407 may be included on the valve flap 402 where it meets the connection 409 to the float 403. Where the connection 409 meets the float 403, there may or may not be another hinge. The connection 409 between the float 403 and the restrictive valve flap 402 should act in a predictable way such that as the float rises, the valve/flow constrictor opens up, and as the float falls, the valve/flow constrictor closes. In some cases, the connection 409 is fairly rigid and/or non-flexible. In other cases, the connection 409 is flexible. The connection 409 may be between about 5-20 cm long in certain cases. A small drain hole 408 in the flap 402 may be optionally included so that the trough 410 can eventually drain completely when the fluid feed into the cell (not shown) and trough 410 is turned off (e.g., when the circulating pump is turned off). In the example shown in FIG. 4, the return conduit 404 has an inner diameter of about 1 inch or more, which would be suitable in the absence of a valve flap restricting the flow for a gravity-driven return flow of about 50 lpm at a vertical drop of more than about 3 feet.

The float 403 should be designed to regulate and overcome the pressure-induced valve closing force. The force on the valve 402 which is transmitted to the float 403 is therefore proportional to the area of the valve orifice region 411. In this simple design, the orifice is the conduit entrance 411. A constriction (i.e., a region where fluid flows through a reduced cross-sectional area) may be used at the conduit inlet 411 to allow the force on the valve surface 402 and size of the required float 403 to be smaller. However, the presence of a constriction at the conduit inlet 411 also reduces the maximum flow that the drain (the combination of the orifice, line, elbows, etc.) can handle. In a particular embodiment of the general design shown in FIG. 4, a constriction having a diameter between about 45-70%, or between about 50-60% the diameter of the return conduit 404, for example about 50% of the diameter of the return conduit 404, may be used at the conduit inlet 411. As a particular example, a design that allows for a variable controlled flow of electrolyte between about 12-50 liters/min with a drop of about 4 feet may have a conduit having a nominal inner diameter of about 1 inch, and may have a control orifice/constriction of about 0.575 inches with a needle control valve of about 0.565 inches, with a float having a diameter of about 5.75 inches or larger.

The diameter of the constriction element is then a controlling factor in the size/design of the flap type valve 402, as these two elements may be directly interacting with one another. In certain implementations, the controlling float 403 is relatively flat and squat (e.g., cylindrical) shape. Other shapes may also be used, such as spheres, ellipsoids, blocks/prisms, etc. In certain embodiments, the trough 410 may also include an overflow tube 413, which may include an overflow sensor 414. The overflow sensor may be used to detect when overflow occurs. This can help prevent the trough 410 from spilling if the restrictive valve flap 402 becomes blocked or stuck, for example. Both the overflow tube 413 and the return conduit 404 may extend down into a reservoir (not shown) such that the outlet of each tube 404 and 413 is below the level of fluid in the reservoir. This helps prevent mixing of gas into the liquid held in the reservoir as the processing fluid exits the tubes 404 and 413.

Figure 5:
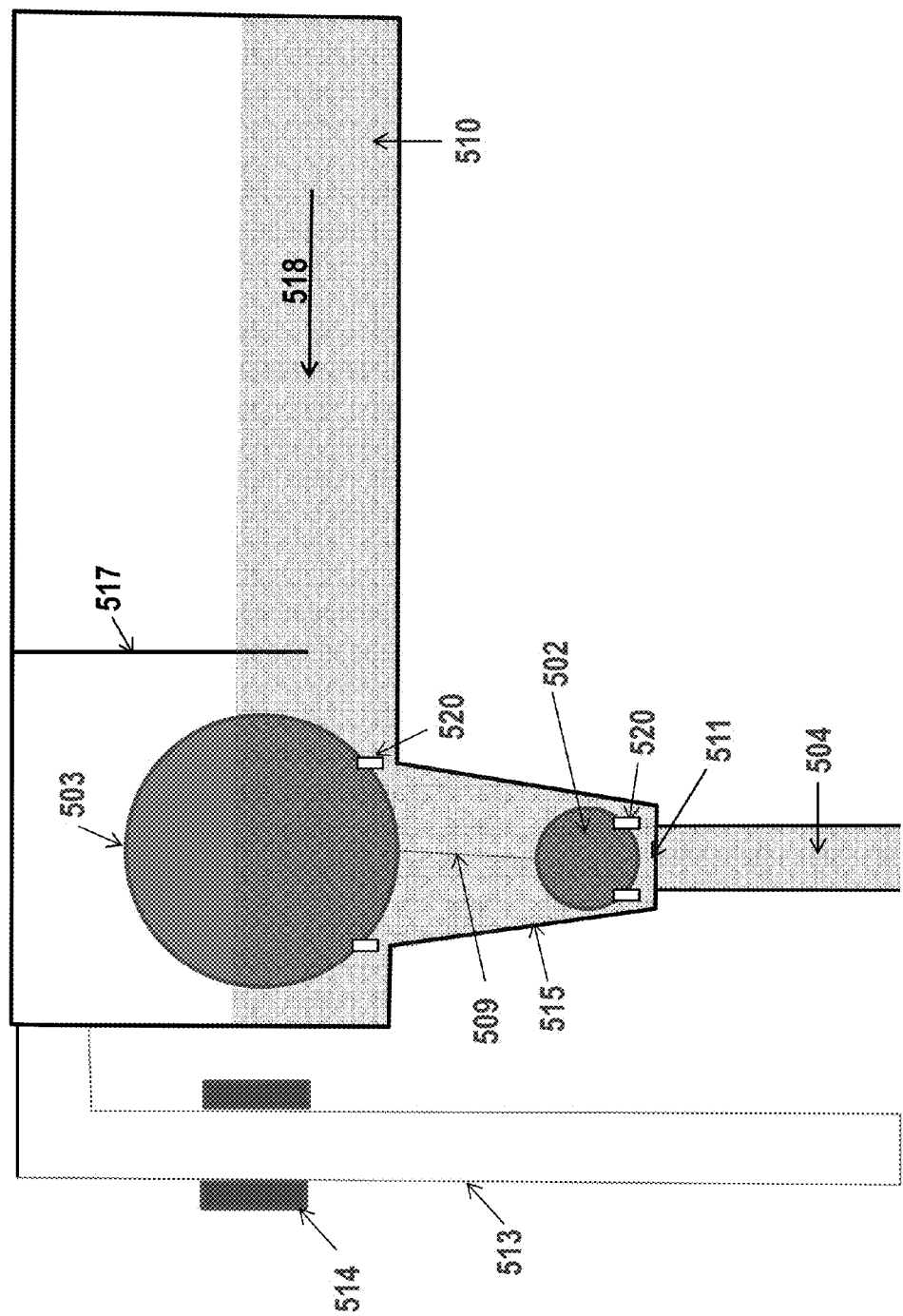
FIG. 5 depicts a trough according to certain embodiments, where the pinch point of an outlet valve is recessed from the trough, the control valve is a solid ball, and the float is a sphere.

FIG. 5 is a modification of the scheme shown in FIG. 4. In this embodiment, a ball float 503 is connected to a ball valve 502 by connection 509. The float 503 is largely hollow (or made from a low density material, e.g., less than about 1 g/cm$^3$, or less than about 0.8 g/cm$^3$) and pulls the substantially solid ball valve 502 up away from the conduit entrance 511 within the constricted region 515 as the fluid level increases in the trough 510. The air phase in the trough 510 is hence vertically separated from the return conduit entrance 511, and air is not transferred into the conduit 504. As the fluid flow rate increases, the level in the trough 510 increases slightly. This causes the float 503 to rise, which raises the control ball valve 502, thereby opening up the return conduit entrance 511 by reducing the degree of constriction at the mouth 511 of the return conduit 504. A baffle 517 may be positioned in the trough 510 to reduce the cross flow forces that may act on the float 503, which could otherwise cause the valve position to fluctuate. The overall direction of fluid flow in the trough 510 is shown by arrow 518.

Similar to the embodiment of FIG. 4, an overflow tube 513 may be included in the trough 510, and an overflow sensor 514 may be positioned in the overflow tube 513 to detect when overflow is occurring. The outlet of both the overflow tube 513 and the return conduit 504 may end below the level of fluid in the reservoir (not shown).

One condition which should be avoided is large oscillation in the instantaneous flow rate (draining rate). If the flow rate out of the trough 510 exceeds the flow rate into the trough 510 for too long, the fluid level may drop temporarily, allowing for the liquid level above the control valve pinch point 511 to drop, which may allow air to be sucked past the ball valve 502, down the return conduit 504 and into the reservoir below. In order to allow the trough 510 to drain when no fluid is circulating, small ridges, gaps, standoffs or similar devices 520 can be incorporated in the design of the float 503 and the ball valve 502 (or other valve, in other embodiments) so that when the float 503/valve 402 are in their down/closed position, the ball valve 402 either doesn't completely close and mate to the return conduit entrance 511, or alternatively, allows for a leakage path even when the units 502 and 511 are seated together. While elements 520 are shown as positive standoff-type structures in FIG. 5, it is understood that in other embodiments, these elements 520 may be negative groove/divot/cut-out-type structures. In certain embodiments, these elements 520 are not included, and the system may be prevented from draining completely. Where this is the case, the system may retain processing fluid in the return conduit 504, even when no fluid is flowing through the system. This may help prevent the introduction of gas into the processing fluid during a transient startup phase when fluid once again begins circulating.

Figure 6:
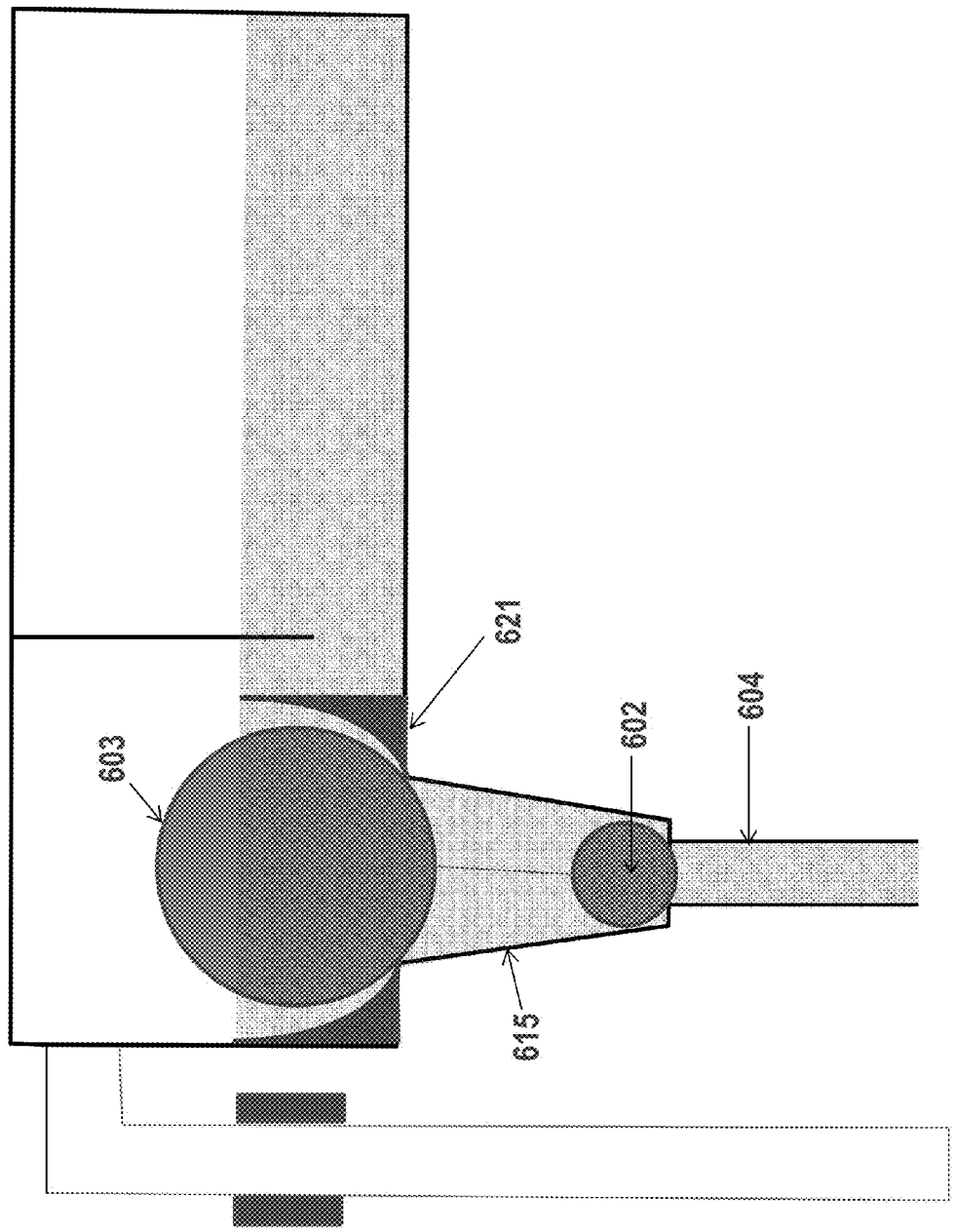
FIG. 6 shows an embodiment similar to the one shown in FIG. 5 that further includes a vortex prevention and float confinement assembly.

FIG. 6 shows a similar embodiment to the one shown in FIG. 5, but further includes a vortex-preventing baffle 621 around the ball float 603, which also acts as a cradle that confines the position of the ball float 603. The vortex-preventing baffle helps prevent a whirl-pool effect that can otherwise act draw air into the constricted region 615 and into the return conduit 604. The other elements in this embodiment may be as shown and described in relation to FIG. 5. While no standoffs/ridges/groove elements are shown, it is understood that these may be included on the ball valve 602 and/or ball float 603 to promote drainage even when no fluid is circulating in the system.

Figure 7:
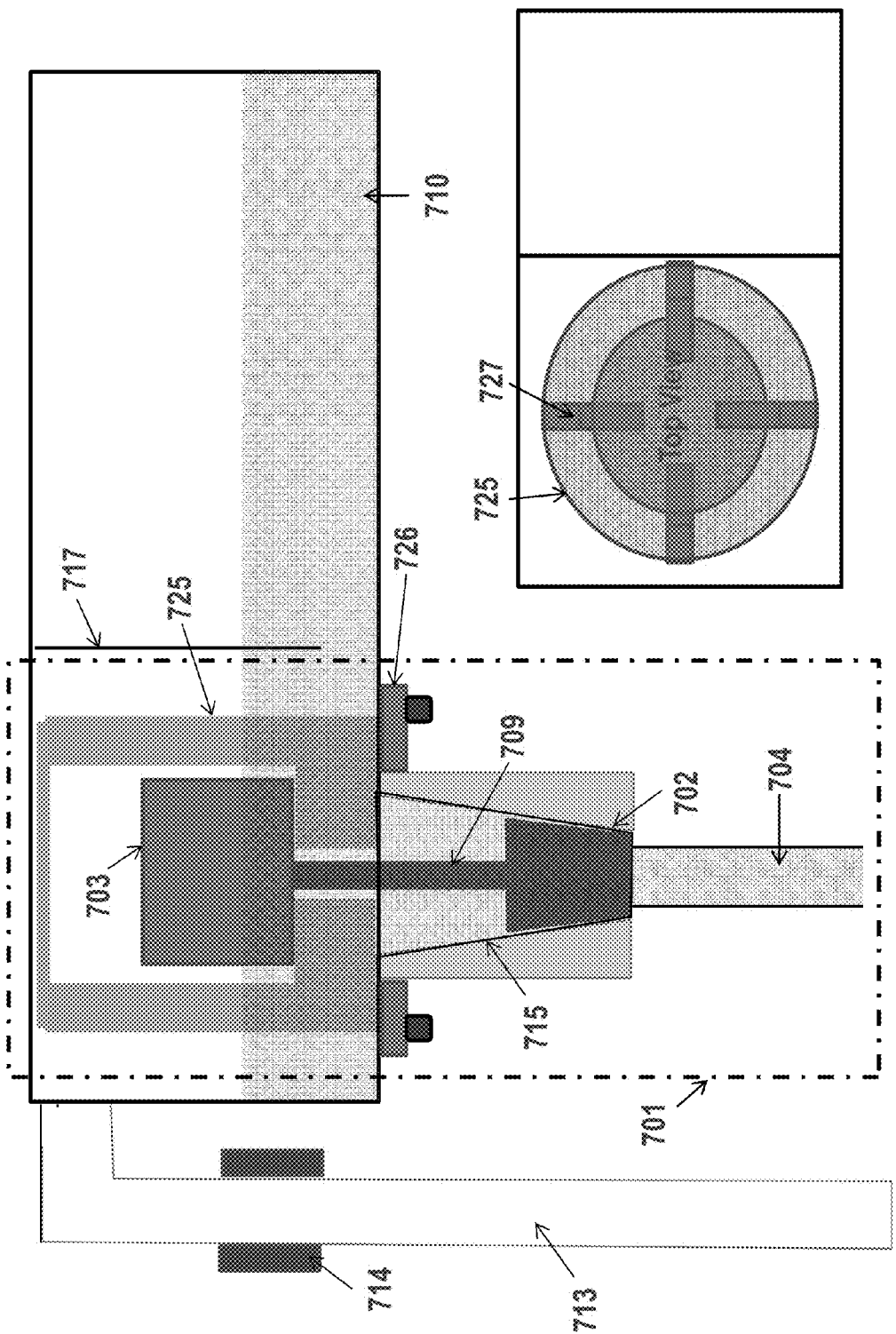
FIG. 7 shows another embodiment of a trough and valve including a separate mountable and replaceable valve mechanism and assembly, further showing a baffle plate within the trough that is used to reduce forces on the valve and flow mechanism and also to reduce the formation of vortices.

FIG. 7 shows a separate mountable and replaceable valve mechanism 701 installed in a trough 710, with the flow in the closed or low flow condition. The apparatus shown within the dotted boxed area 701 may be provided as a single removable unit, allowing for easy replacement as needed. The replaceable valve mechanism 701 may be mounted to the trough 710 by a control valve assembly mount 726, which may take any suitable form. The replaceable valve mechanism 701 may also be installed proximate a baffle 717. The float 703 shown in FIG. 7 is cylindrical in shape (though other shapes may be used as well), and is connected to a control valve 702 housed in a conical constricted flow section 715 of the apparatus. In the embodiment of FIG. 7, the constricted flow section 715 is shaped like a truncated cone. As the valve 702 is lifted, the flow resistance is reduced and the flow rate through the return conduit 704 increases, all the while preventing the introduction of air flow into the return conduit 704. The float 703 may be contained in an open "cage" 725 to restrict the movement of the float 703, the cage elements 725 further acting as baffles preventing the formation of vortices. The bottom right portion of FIG. 7 shows a top-down view of the cage 725 with baffles 727 that extend inwards to help prevent any whirl-pool effect that may otherwise allow air to enter the constricted flow region 715 and return conduit 704. An overflow tube 713 fitted with an overflow sensor 714 may be provided to help prevent spills. The outlet of the overflow tube 713 and return conduit 704 may end below the fluid level in a reservoir (not shown).

Figure 8:
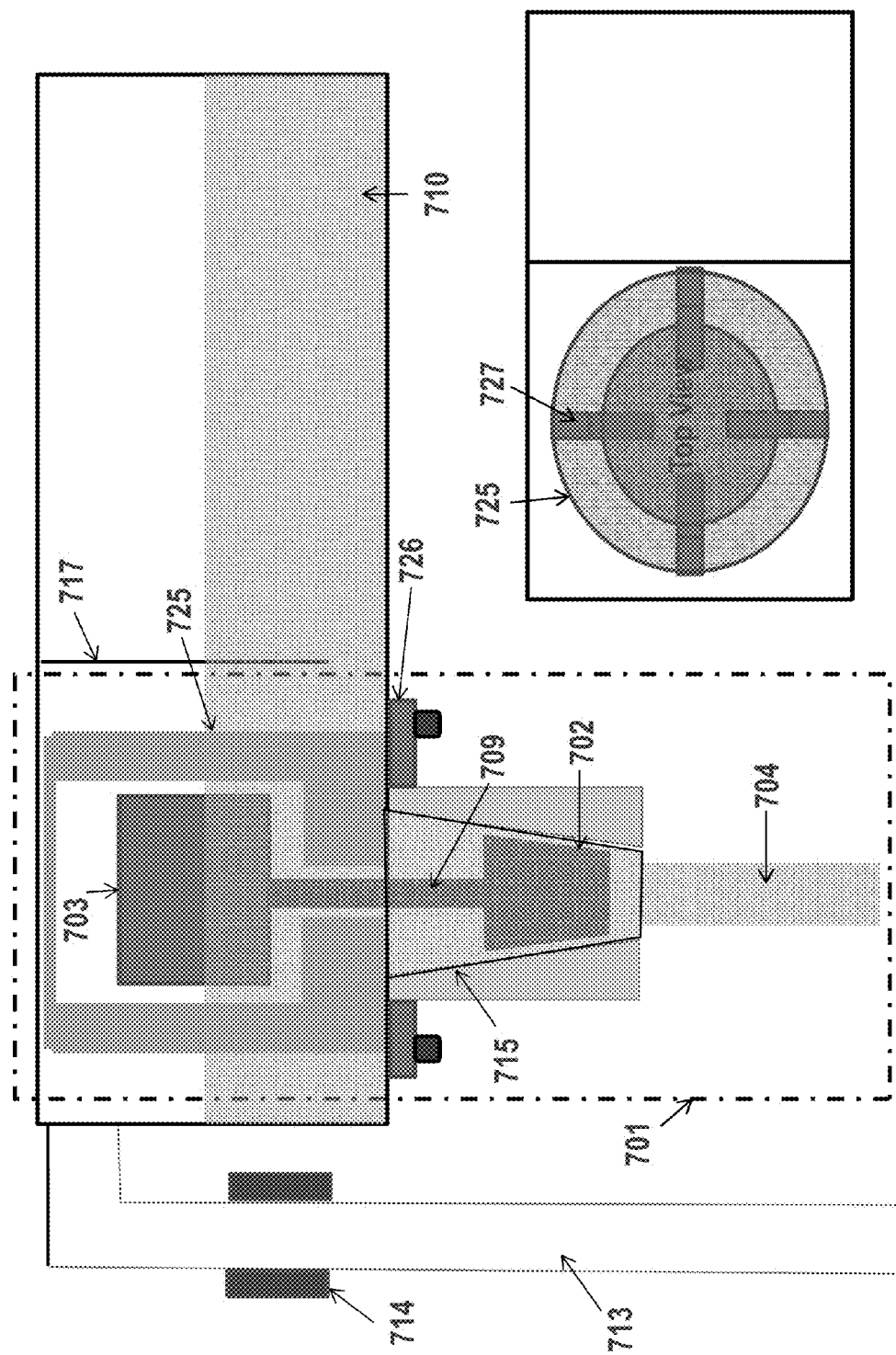
FIG. 8 depicts the trough and valve of FIG. 7 at a more open position, which allows for a higher air-free draining flow rate.

FIG. 8 shows the embodiment of FIG. 7, but at a more open/higher flow rate position. The valve assembly 701 is mounted at the base of the trough through control valve assembly mounts 726. The valve 702 is housed in a drop down constricted flow section 715 below the rest of the trough 710. The control valve assembly mounts 726 may include a gasket, o-ring, or other similar mechanism at the base of the trough 710 to provide a good seal while allowing for easy replacement.

Figure 9:
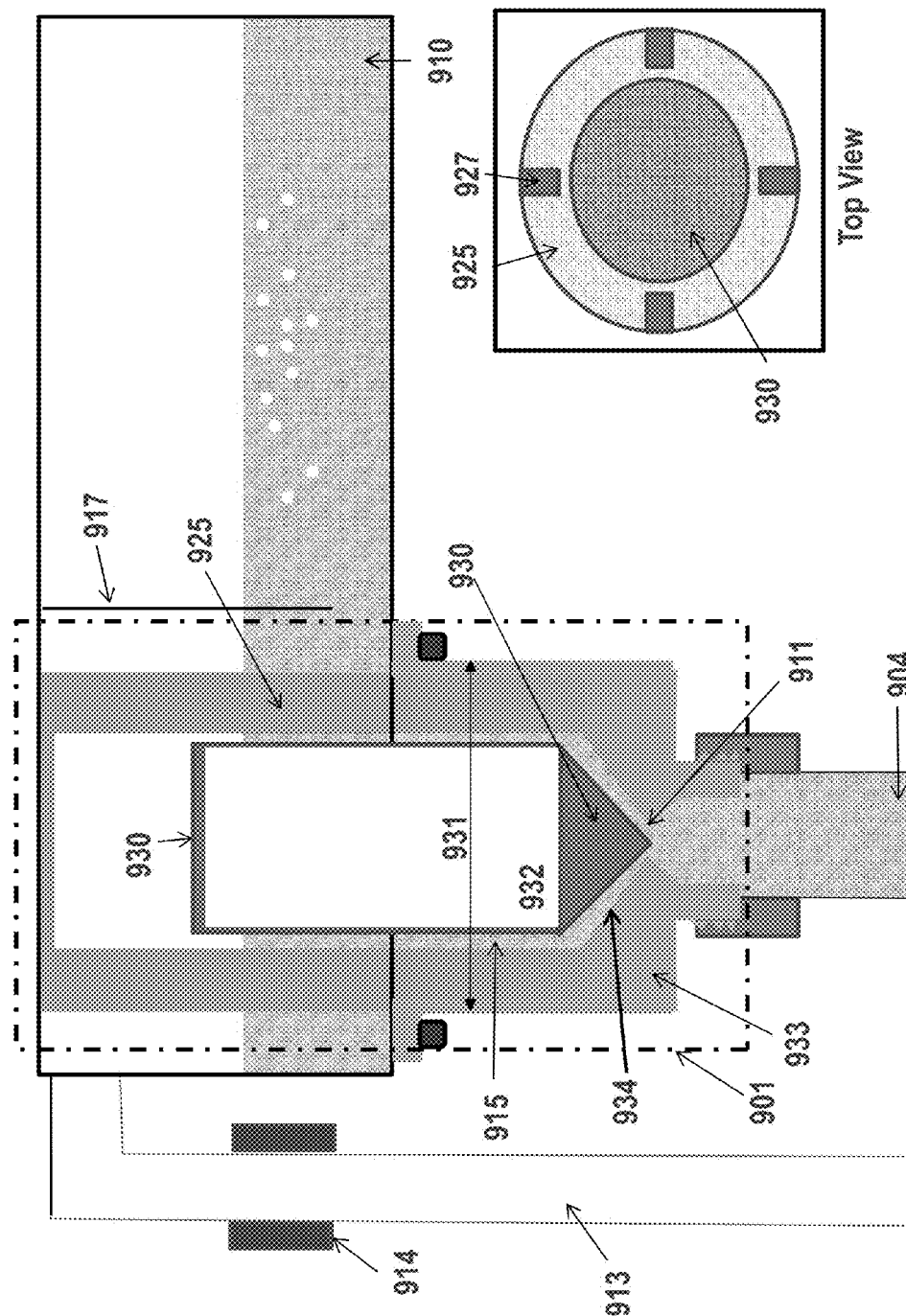
FIG. 9 shows another embodiment of a trough and valve, where there is a combined single body float and valve mechanism.

FIG. 9 shows an alternative design of a trough 910 and control valve 930 where the float and the valve element are included together in a single element/piece 930. The control valve/float 930 operates under a similar principle as in previous embodiments. When the flow rate through a processing cell and into a trough 910 increases, the level of fluid in the trough 910 rises. This causes the valve/float 930 to rise, which decreases the resistance to flow in the constricted flow region 915 and increases the flow rate through the return conduit 904. While the system may be scaled for any appropriate flow rates and fluids, in certain embodiments the diameter of a flow control assembly 901 (as measured by the distance 931 between opposite sides of the flow control assembly 901) is between about 2-6 inches, or between about 3-5 inches, for example about 4 inches. This may be between about 200-600%, for example about 300-500% of the inner diameter of the return conduit 904. The diameter of the body of the valve/float 930 within the flow control assembly 901 may be between about 125-600%, or between about 200-400% of the inner diameter of the return conduit 904.

Figure 10:
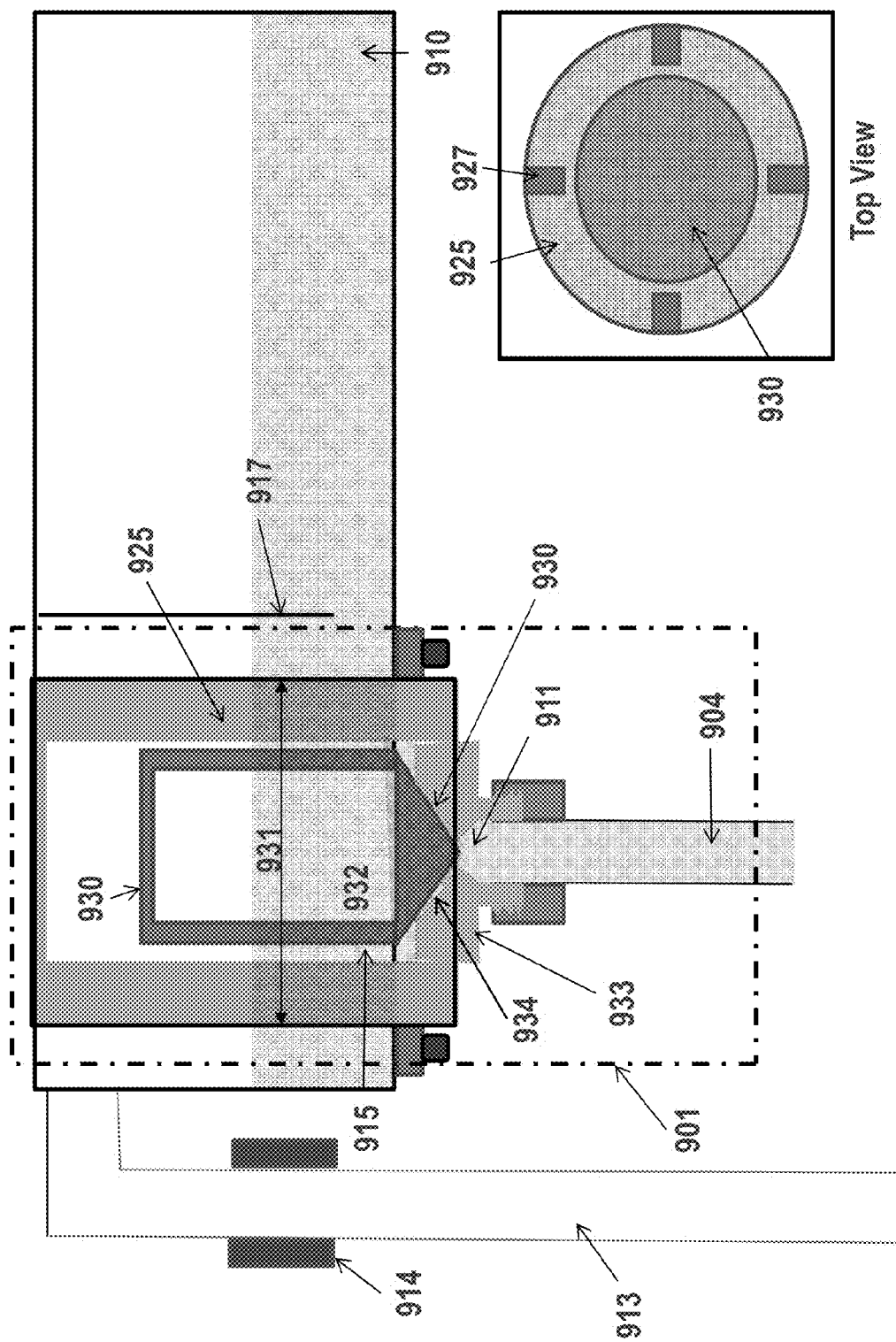
FIG. 10 shows an embodiment of a trough and valve that is similar to those shown in FIG. 9, but with a lower profile and smaller dimensions, suitable for example for smaller elevation drop operations where space below the collection trough or modules may be an important limiting factor.

The embodiment of FIG. 10 is similar to the embodiment shown in FIG. 9, but has a lower profile and smaller float 930, suitable for use with a system having smaller vertical drops from the trough to the reservoir.

The disclosed designs shown in FIGS. 9 and 10 allow for a very light weight float/valve element 930 with substantial buoyancy force due to its relatively large displacement volume and low weight (i.e., large shape and low average density). Operation of the valve 930 may be modulated by inserting high density material into an inside cavity 932 of the cylindrical float 930, particularly at the base, which may give the unit added mechanical stability and allow for tuning for operation at the appropriate fluid level within the trough (e.g., half full at the average flow rate). Similarly, a float/valve 930 may include a denser material near its base and a less dense material in a top portion to achieve the same effect.

The control valve/float 930 may be positioned in a valve housing portion 933 connected to the trough 910. The valve housing 933 may extend below other portions of the trough 910, as shown, and may be sealed with a gasket, o-ring or other type of seal. In certain embodiments, a bottom inner surface 934 of the valve housing 933 may be designed to mate (exactly or approximately) with the control valve/float 930. The bottom inner surface 934 of the valve housing 933 may also be referred to as the valve mating surface 933. The valve mating surface 933 will typically include a "choke point" orifice 911 at or near its center. The diameter of the choke point 911 may be smaller than the inner diameter of the return conduit 904, for example between about 25-75% the diameter of the return conduit 904. In a particular implementation, the choke point 911 has a diameter of about 0.5 inches. When the liquid level in the trough 910 is sufficiently high, the control valve/float 930 rises, and liquid passes through the choke point orifice 911. When the liquid level is sufficiently low, the control valve/float 930 sinks downwards to block (fully or partially) the choke point orifice 911. This helps increase the resistance to flow in the constricted flow region 915, and helps ensure that bubbles do not enter the return conduit 904.

As with the apparatus shown in FIGS. 7 and 8, the float/valve 930 may be provided in a cage assembly 925, which may include baffles 927 to help prevent the formation of vortices above the choke point 911. Further, an overflow conduit 913 including an optional overflow sensor 914 may be included to help prevent the trough 910 from spilling.

In various embodiments, the valve mating surface 934 may be conically shaped to approximately or exactly mate with the bottom conical surface of the control valve/float 930. In some embodiments, the two surfaces (the conical surface of control valve/float 930 and the valve mating surface 934) may be substantially parallel. In other embodiments, the conical surface of the control valve/float 930 may have a steeper taper than the valve mating surface 934. In other words, the control valve/float 930 may be pointier than the housing 933 in which it sits. This design may help concentrate the pressure drop into a small region below the valve, thereby reducing the float lifting force required for mechanical equilibrium.

Ignoring other pressure drop components in the plumbing, the pressure drop over the valve 930 should be approximately equal to the pressure drop associated with the fluid head/height. The force on the float 930 is proportional to the difference in pressure between 1) the pressure above the valve 930 and 2) the integrated differential pressure over the area of the region of lower pressure below the valve/float 930. By reducing the cross-sectional area of the low pressure region as much as possible and concentrating the pressure drop into a relatively small region at the pinch point 911, the lifting force supplied by the displaced liquid volume is reduced, thereby reducing the necessary size of the float/valve 930. This may be an important feature of the design in certain applications where space inside the apparatus or facility is at a minimum. A much more compact but equally effective control device is achieved.

Figure 11:
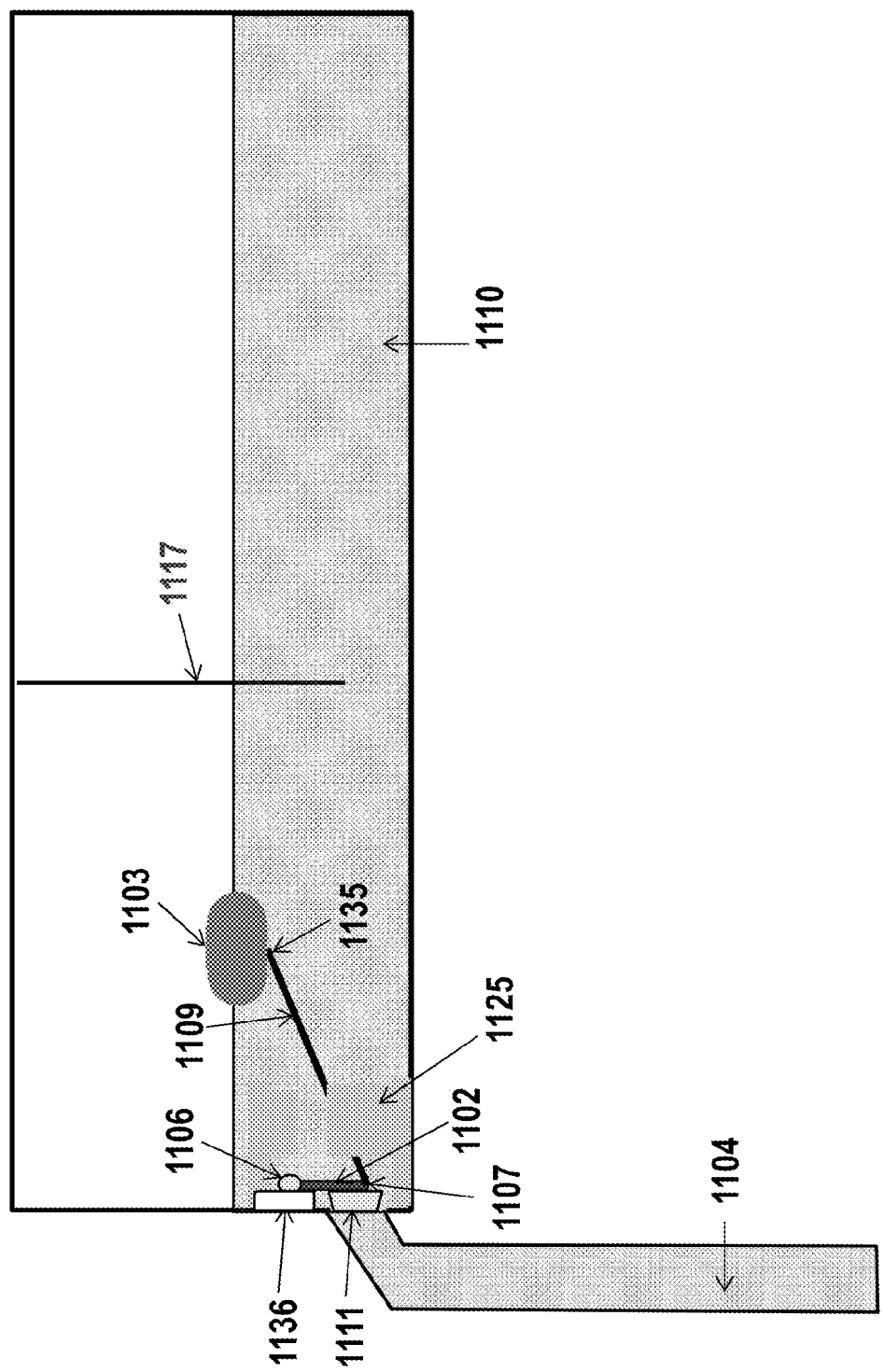
FIG. 11 depicts an alternative compact trough and valve assembly incorporating a mechanical valve control mechanism via a hinge and lever assembly attached to a valve position controlling float.

FIG. 11 shows an alternative embodiment of a trough 1110, control valve 1102 and return conduit 1104. This embodiment differs from many of the embodiments above in that the control valve 1102 resides at the side of the return fluid collection trough 1104. Therefore, this embodiment may be particularly suited for situations where the amount of space below the trough 1110 to the bath/reservoir is very limited. A flap-type control valve 1102 may be positioned and held by a hinge 1106 in front of the return flow conduit inlet 1111. The valve 1102 swings and rotates around the hinge point 1106, opening up the area around the return conduit inlet 1111 and reducing the flow restriction/resistance proximate the inlet 1111. A standoff, ridge, groove, or other type of mechanism 1136 may optionally be used to prevent the valve 1102 from completely closing, allowing the trough 1110 to drain when fluid is not flowing, for example.

The valve position may be regulated via a connection 1109 to a float 1103. For example, the connection 1109 may be a mechanical advantage increasing lever arm. The value of the mechanical advantage increase corresponds approximately to the ratio of the length of the connection 1109 from the valve 1102 to the float 1103, to the average distance from the hinge point 1106 to the connection point 1107 on the valve. As the flow rate into the trough increases, the liquid level in the trough increases, the float rises, and the valve constriction is reduced (i.e., the valve opens further). As with other designs, baffles and similar vortex-preventing constructs, as well as level sensors, may be included to prevent inadvertent entrainment of bubbles into the return conduit and bath/reservoir. Additional elements that may be used include an inlet baffle 1117 for reducing cross flow across the trough 1110, and a cage 1125 with vortex-prevention baffles for minimizing the likelihood of forming vortices. Further, an optional overflow conduit (not shown) may be used.

Figure 12:
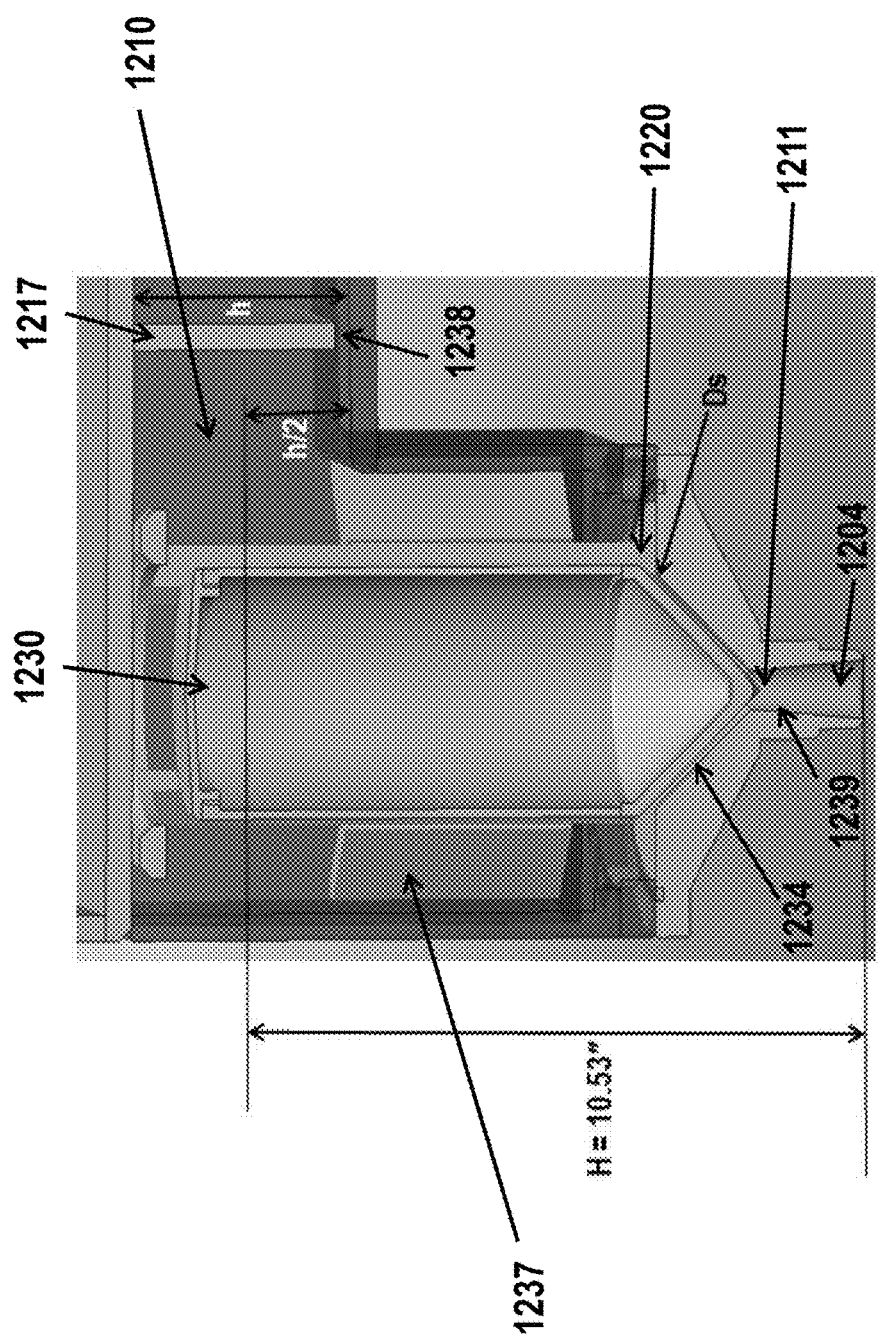
FIGS. 12-14 depict alternative implementations of the float/valve assemblies shown in FIGS. 9 and 10.
Figure 13:
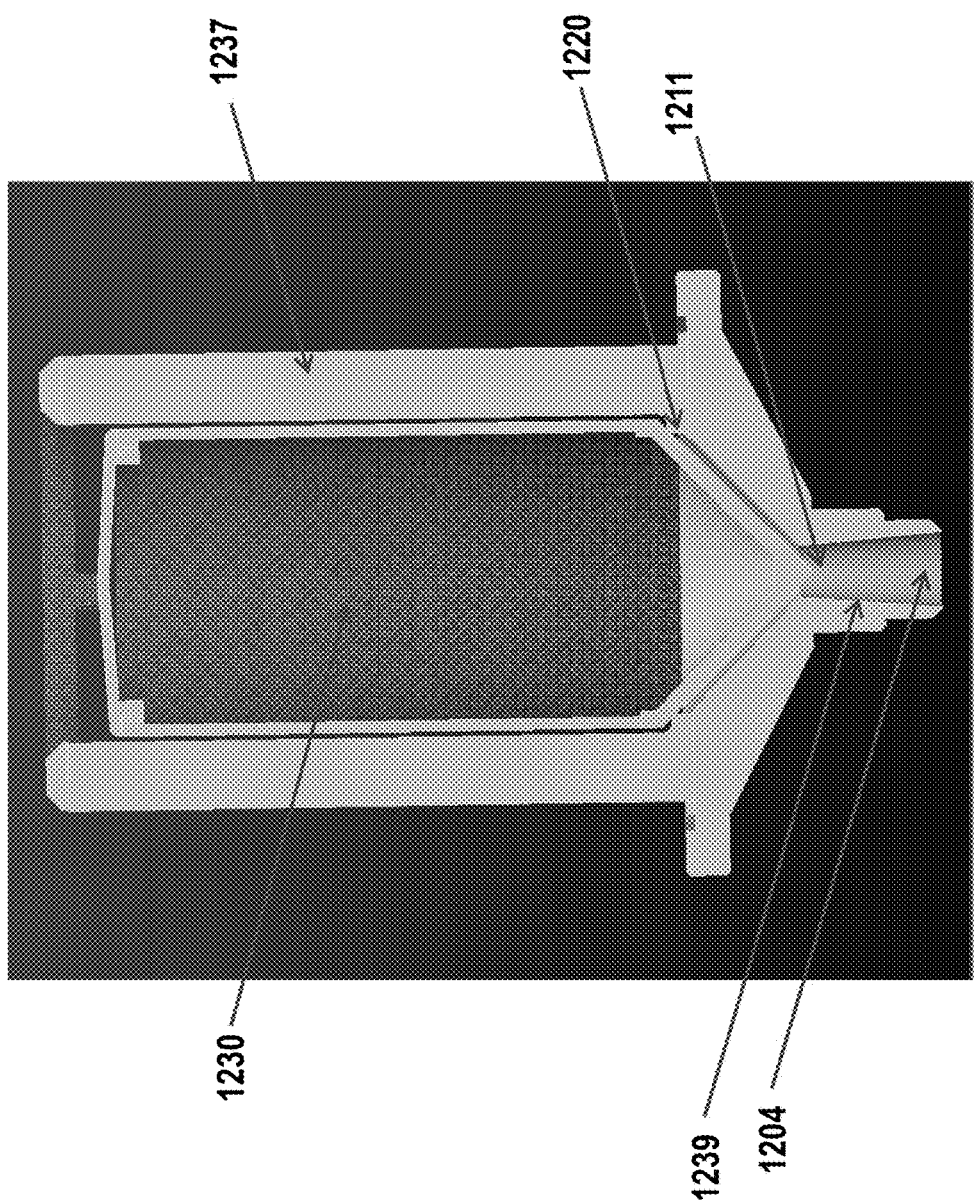
Figure 14:
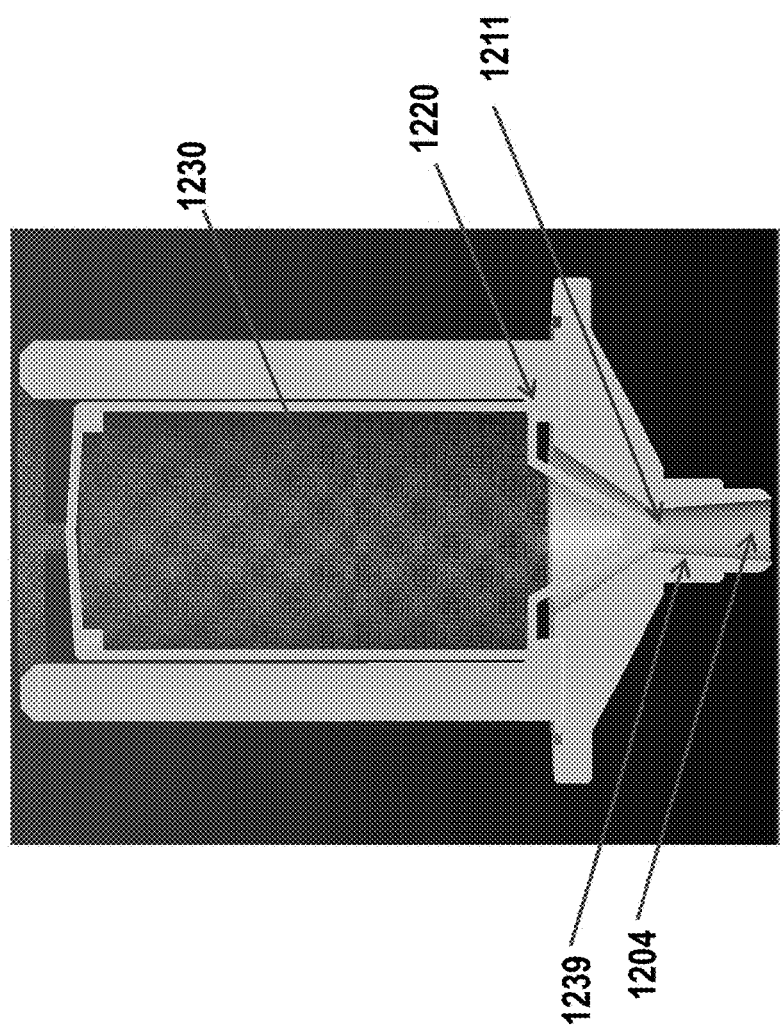

FIGS. 12-14 present detailed cross sectional drawings of a design similar to that shown in FIG. 10. Notable features in these drawings include the details of the control flow choke point 1211 relative to the shape of the valve 1212 and the valve mating surface 1234. Due to the sloped nature of the valve surface 1230 and valve mating surface 1234, the flow velocity increases as the fluid moves radially inwards. The pressure drop therefore is focused near the choke point 1211, and the force acting on the base of the float is concentrated near the choke point 1211 of the valve 1230. This reduces the total reactive force needed by the float/valve 1230. The constriction 1211 can be sized so that when the float/valve 1230 moves a distance up in the trough 1210 and away from the choke point 1211, the pressure drop decreases to a suitable value for the target maximum flow rate, with minimal added resistance due to the presence of the float/valve 1230. The float/valve 1230 and/or the valve mating surface 1234 may include standoffs/ridges/cutouts/divots/etc. 1220 to allow for fluid to drain through the choke point 1211 even when the float/valve is in its (relatively) closed position. In other embodiments, these may be omitted and a fluid tight seal may be obtained. This may allow the return conduit 1204 to remain full of liquid, even when processing fluid is not circulating through the system. Also shown is an inlet baffle plate 1217, having height h. Below the baffle 1217 is a flow gap 1238. A series of baffle plates 1237 may also be provided in the space around the float/valve 1230, to help prevent the formation of vortices.

The initial portion 1239 of the return conduit inlet 1204 (which in some cases may also be considered the outlet of an orifice/choke point 1211 in the control valve housing) may be tapered such that the cross-sectional area of the conduit 1204 is smaller in an upper portion 1239 and larger in a lower portion, as shown in FIGS. 12-14. This tapering may help minimize any further pressure drops.

In some embodiments the control valve assembly includes a float position stop-spacer 1220 that prevents the valve constriction from completely sealing off the orifice opening 1211, thereby avoiding the potential for jamming, and allowing the trough to drain when the supply of fluid to the cells and trough is stopped. In other designs, the valve 1230 may be designed to close the orifice 1211 completely such that when the flow of fluid into a plating cell and trough is stopped, the trough does not completely drain.

Where an orifice remains completely closed, liquid may remain in the return conduit in a non-flowing state. In other words, the return conduit may remain flooded, and on re-start (i.e., when fluid once again begins circulating to the processing cell and trough), there may be little or no introduction of bubbles to the return conduit and reservoir. Otherwise, there may be a transient period at the start of fluid circulation in which gas/bubbles may be introduced to the return conduit and reservoir. FIG. 14 shows a design similar to those shown in FIGS. 12 and 13, but with the size of the conical valve section 1230 (relative to the flow) reduced.

Much of the discussion and many of the examples above are presented in the context of a fluid return system having a drain collection "trough" or gutter that collects and directs fluid to a single return conduit. However, it is understood that this element is not required, and may not be desirable in all contexts (e.g., these embodiments may be most beneficial when there is limited space available in the horizontal plane of the processing module, where it is undesirable to have a cell-level trough). The gravity regulated float and control valve and other features described above can also be incorporated directly into a processing module itself (e.g., in an annular cell-level trough surrounding a weir around the periphery of a processing module's main plating volume/fountain). In some cases, the use of a cell-level trough allows for an expanded plane or workspace. The use of a cell-level trough may also allow for multiple cells on a single horizontal level to have a combined return flow regulation feature.

Active Electronic or Pneumatic Fluid Level Drain Rate Feedback Regulating Designs In addition to regulating the flow to be bubble- and turbulence-free by mechanical and largely passive self-regulating designs, the same objectives may be accomplished using a combination of automated process-control devices such as valves, flow meters, level sensors, pressure sensors, and flow diverts, etc. One potential advantage of some of the active control designs is that the system may be more compact than a passive control system. Further, active control systems can more easily eliminate certain elements such as a large common collection trough, etc. The available space, relative cost, possible failure modes and preventions, and other tradeoffs between an active (e.g., electrically or pneumatically controlled) versus a passive (e.g., mechanically self-regulating) drain design should be considered when implementing a fluid recirculation and control scheme.

One notable piece of process equipment of the actively controlled bubble-free drain design is an active automated settable control valve. These are sometime referred to as automated process control valves or automated proportional control valves. The flow rate through an automated control valve need not be linear with valve input (e.g., pressure or voltage input) in many of the embodiment described hereafter. Rather, the automated control systems only require a mechanism to respond to a valve automated input in a known/predictable way. Particular examples of classes of control valves include, but are not limited to, ball, needle and gate valve, each of which can be automated by varying the position, size and/or shape of the valve flow orifice using a non-manual position regulating device. The exact choice of valve type is not particularly restricted, and many different types/shapes/sizes of valves may be used. However, the resistance of the valve, as measured by the valve's resistance coefficient ($C_v$ as described in relation to Equation 1 above) should be sufficiently large when the valve is fully open to accommodate the maximum target draining flow rate. Other restrictions in selection of an appropriate valve may include the necessary response time of the valve (i.e., how quickly the valve changes position) which is described in more detail below. Examples of suitable valves include the AutoValve™ (from FutureStar of Chanhassen, Minn.), the NT Proportional Control Valve Model 6400 Series (from Entegris of Billerica, Mass.) and the Automated Ball Control Valve (for example from Plast-O-Matic, of Cedar Grove, N.J.).

At least two classes of automated bubble-free drain flow controlled embodiments are presented which can be broadly describes as follows. In a first class, an automated variable resistance return (or variable resistance return) may be used, where the flow in the return conduit is set or actively controlled to match any changes in the set flow rate entering the processing cell(s). In a second class, an automated variable flow diversion (or variable flow diversion) may be used, where the resistance to flow return in the drain is pre-tuned and static to create bubble free drain flow at one (e.g., maximum target) fixed flow rate, the flow in the return conduit always being equal to that fixed flow rate, and the pump always delivering fluid to the processing cells at that fixed flow rate, and a portion of the total fixed flow rate being diverted to enter the processing chamber to make contact with the wafer, with the remainder of the total flow directed to the cell collection trough or flooded common return.

Figure 15:
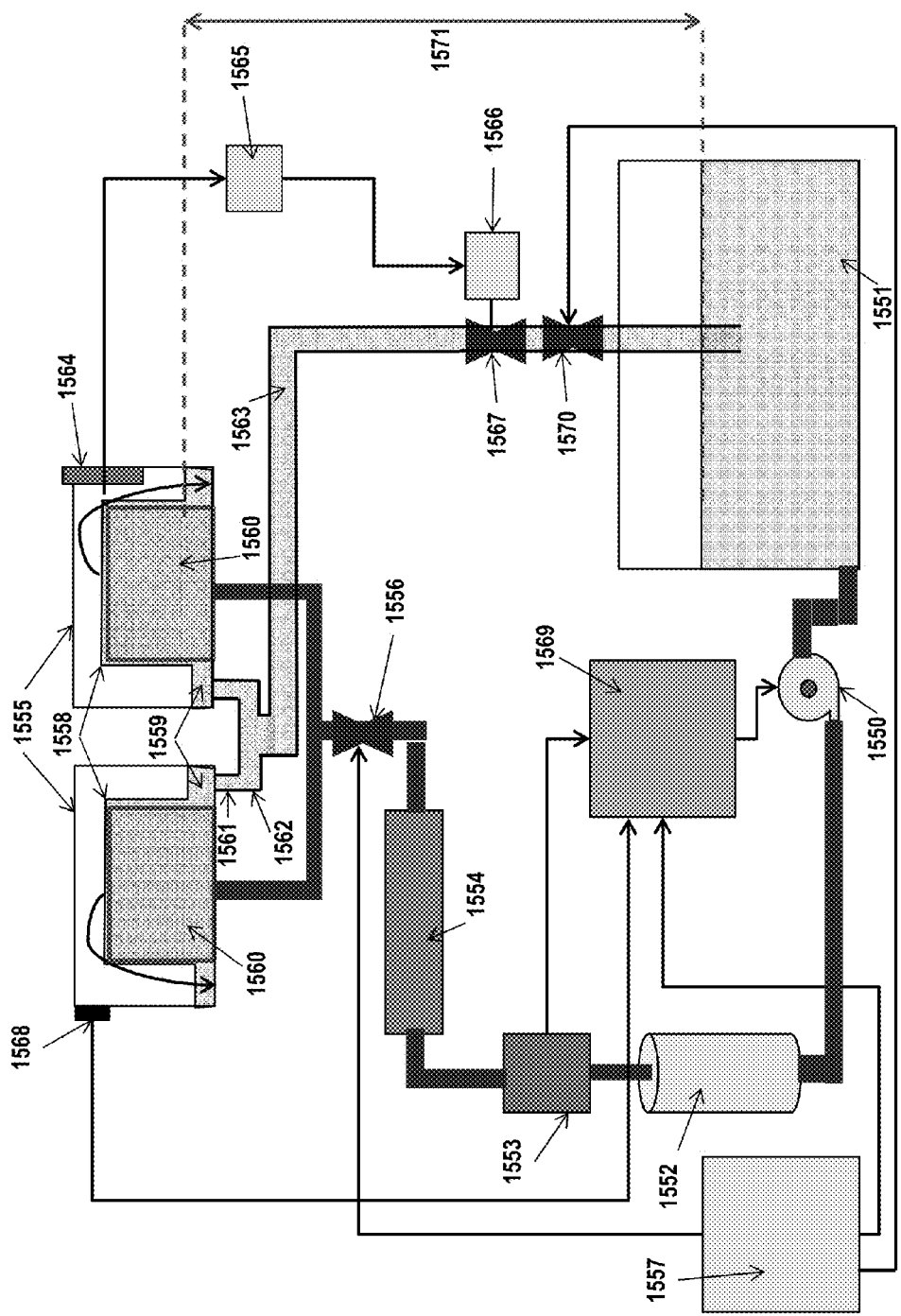
FIGS. 15 and 16 show schematic representations of processing systems having multiple processing cells that share a recirculation system and reservoir, where variable resistance is used in a return conduit to achieve bubble-free flow.

FIG. 15 shows an example of the variable resistance return design of the first class described above. A pump 1550 draws fluid from a fluid reservoir or bath 1551 creating the necessary pressure to drive the fluid through the pipe to a higher elevation and though various elements such as process filters 1552, flow meters 1553, degassers 1554, elbows, etc. The degasser 1554 may be used to remove oxygen and other gases from the electrolyte. This may be beneficial in ensuring that any gas present in the fluid delivered to a processing module 1555 is less than saturated in the fluid. This reduces the likelihood of forming bubbles in a processing module 1555 that could otherwise block the flow of current between the counter electrode and the wafer (not shown). In other words, a degasser 1554 helps ensure that bubbles do not form on the surface of a wafer (which would otherwise cause significant plating defects), and that bubbles do not form on the surface of a channeled ionically resistive plate (which would otherwise block current from passing through the plate and cause plating defects).

In these or other embodiments, the feed line may contain a cell-feed-isolation-valve (CFIV) 1556, which closes when the pump 1550 is turned off, thereby preventing the cells 1555 from draining backwards though the feed lines, and keeping the cell 1555 and tool bubble-free when the pump 1550 is eventually restarted. Thus, even transient states of bubble formation may be avoided. The CFIV 1556 can close under the direction of the system controller (e.g., a wafer and operation process controller 1557) automatically, or in response to an emergency off (EMO) condition or switch trigger. An emergency off trigger may be included, for example, to avoid catastrophic leakage when secondary containment leakages are detected.

FIG. 15 shows fluid entering a fountain type plating cell 1555 and passing over the fountain weir 1558 and collecting in the cell fluid collection trough 1559. The embodiments are not limited to fountain type plating apparatus. For example, a paddle cell, spray etcher or spray electroless plating cell reactor, a microfluidic cell, etc. may all benefit from the disclosed techniques and apparatus. In general, fluid passes through the processing cell 1555 and is directed generally toward the wafer and into a primary fluid containment area 1560 before passing over a weir wall 1558 and into a cell-level fluid collection region/trough 1559 (e.g., an annular trough 1559 positioned around the periphery of the primary fluid containment area 1560 of a processing cell 1555). From the trough 1559, the fluid passes into a processing module drain 1561, which may feed into a common return region 1562 that remains flooded with liquid. The fluid then passes from the common return region 1562, through a common drain 1563 to the reservoir 1551, where it can again be pumped out and recycled to the processing cells 1555.

A signal from a fluid level sensor 1564 may be used to measure the level of fluid in the primary fluid containment area 1560 of the processing cell(s) 1555, to sense the level of fluid in the collection trough 1559, and to ensure that the fluid level in the trough 1559 is sufficiently above the level of the inlet to the processing module drain 1561. The signal from the fluid level sensor 1564 may be fed to a drain process controller 1565. The drain process controller 1565 may communicate with an automated drain valve position controller 1566, for example by modulating a voltage pneumatic pressure delivered to the automated drain valve position controller 1566, which opens and closes the automated drain valve 1567 in response to the signal received from the drain process controller 1565. This allows the drain valve 1567 to be controlled so as to maintain a target level of fluid in the cell collection trough 1559.

While many different types of level sensors may be employed, the design of a particular system is impacted by the type of sensor used. Examples of suitable fluid level sensors 1564 include acoustic echo type sensors, capacitive strip sensors, and high sensitivity pressure transducer sensors. The acoustic echo type sensor may sense the fluid level in the cell collection trough area 1559 directly or via a sight tube connected in parallel to the trough. A pressure transducer may measure the pressure head of fluid a few inches (for example about 3 inches) below the fluid level in a return pipe 1561 or flooded common return region 1562. For example, a 10 inch-of-water-full-scale pressure transducer can be placed to measure the fluid head in a region from about 2-7 inches below the cells 1555, for example, and inside a flooded common drain return 1561 located below the target liquid control level line.

An optional overflow sensor switch 1568 can be placed in one or more of the cells 1555 to detect failures such as valve opening errors. In response to an error sensor signal from an overflow sensor 1568, a controller (e.g., the flow controller 1569) may shut off the pump 1550 and optionally close the cell isolation valve(s) 1556 and/or drain isolations valve(s) (DIV) 1570. While the automated drain control valve 1567 may be able to close completely and thus may be used to isolate the drain and keep the fluid in the cell-level fluid collection trough 1559 at a sufficiently high level under stop-flow or EMO conditions, a two state (open or closed) drain isolation valve (DIV) 1570 may react quicker and may also provide added protection against leaks if the automated drain valve 1567 fails. Also shown in FIG. 15 is the drop distance 1571, the distance between the fluid level at the cell-level troughs 1559 and the fluid level in the reservoir 1551. In certain examples, this distance is described to be about 5 feet.

As an alternative to an automated electronic overflow control protection just described, a separate set of oversized overflow drain lines may be used to allow the return of fluid to the reservoir 1551. The overflow drain lines may optionally have sensors (e.g., capacitive or through beam optical type sensors) to sense whether overflow is occurring. In various embodiments, the overflow sensors can be used to trigger various desirable corrective and/or preventive system responses.

Figure 16:
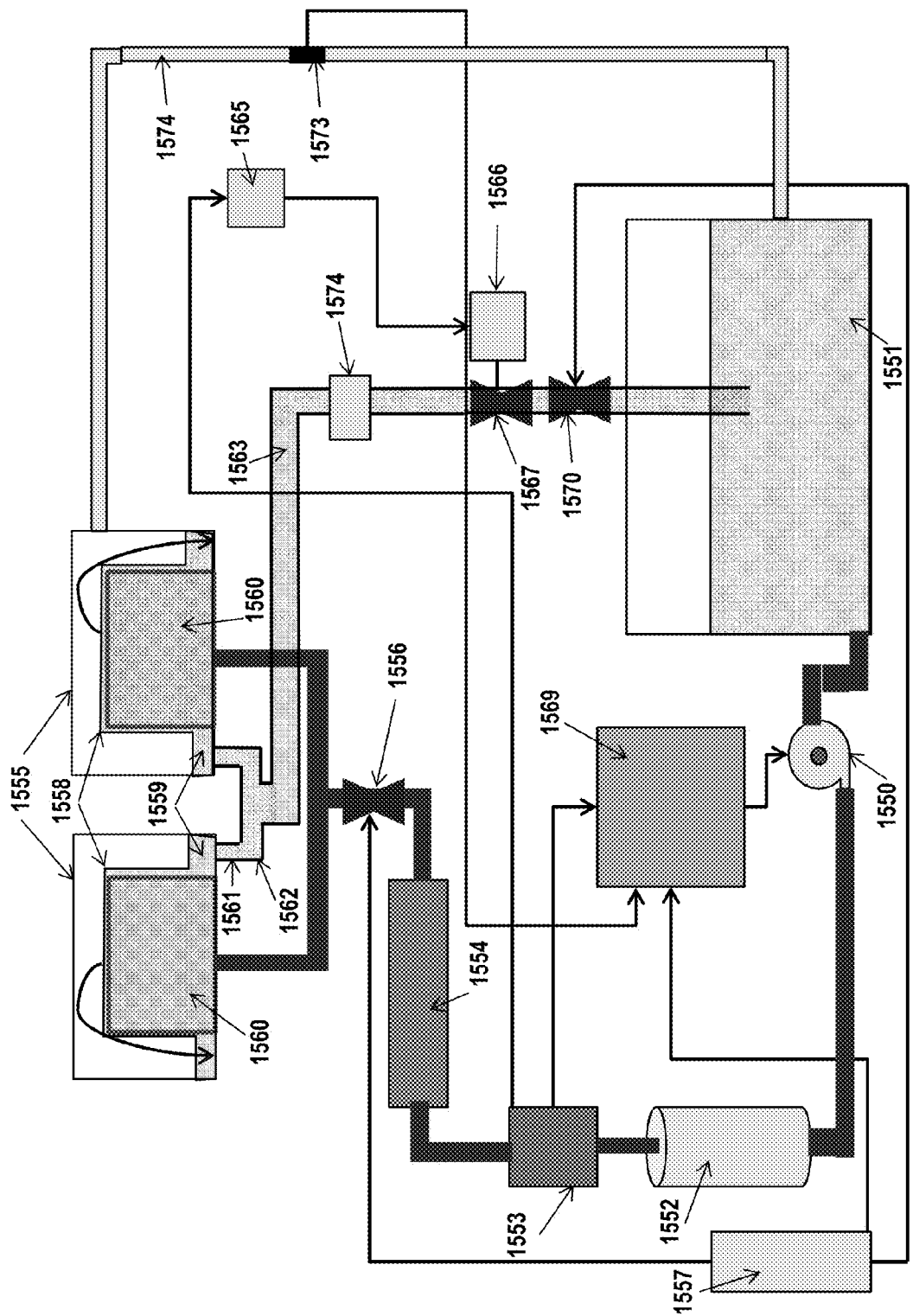

Another variable drain resistance design is shown in FIG. 16, where a level sensor is not employed as part of the fluid level control. In this embodiment, a signal from the flow controller 1569 is used to control both the pump speed (to promote a target flow rate) and the position of the automated drain valve 1567. An overflow drain line 1572 having an overflow sensor 1573 may be used as described above. A predetermined valve position vs. flow rate relationship may be established theoretically or experimentally with the goal of establishing a relationship between the appropriate setting for the valve position to achieve a control valve resistance that maintains a backed up and bubble-free drain line.

For example, an operator can perform a set of experiments at various cell flow rates and collect a set of data related to valve settings (e.g., input voltages, pressures or % open settings, etc.) to identify conditions that may be used to maintain a level of fluid in the collection trough 1559 at a desired level (e.g., 1 inch above the drain inlet) for each flow rate. Then, having that data, interpolation or curve fitting can be used to create a mathematical relationship between an appropriate input signal to the automated drain valve 1567 (e.g., voltage or pressure) for any possible flow meter detected flow. This mathematical relationship may be programmed into a programmable logic controller (PLC) 1566 or other process controller to set the valve position based on an instantaneous flow meter 1553 reading.

This method may have some advantages over that described in the paragraph above and in reference to FIG. 15, such as better reliability and lower cost (fewer elements in the system to purchase or to fail), but may also have some disadvantages such as the need for a very accurate calibration of the resistance setting vs. flow rate. This accurate calibration may be needed because the only way to provide feedback in the system for level/flow error control is a small increase in the fluid level in the cell 1555, which is generally quite limited relative to the fluid level drop/total head. As described above, the accuracy of the valve 1567 and its calibration should be good (e.g., better than about 2%). Further, the valve position reproducibility (i.e., the reproducibility of achieving a certain valve position based on a given input to the automated drain valve 1567) is more important in the embodiment of FIG. 16 as compared to the embodiment of FIG. 15. If the calibration is off (e.g., if the valve behavior has changed, or if for any reason the position of the valve 1567 does not correspond to that expected from the calibration process), the cell 1555 may overflow (causing shutdown) or underflow (causing the introduction of bubbles into the processing drain 1561 and common return line 1563). Therefore, in certain embodiments, an optional optical through beam deflection sensor 1574 or other mechanism for sensing bubbles may be included in the common return conduit 1563. This element 1574 is especially beneficial in the design of FIG. 16 where the fluid level in the cell 1555 is not controlled based on system feedback. Thus, depending on the requirements and limitations of a particular application, one or the other type of system may be desirable.

Figure 17:
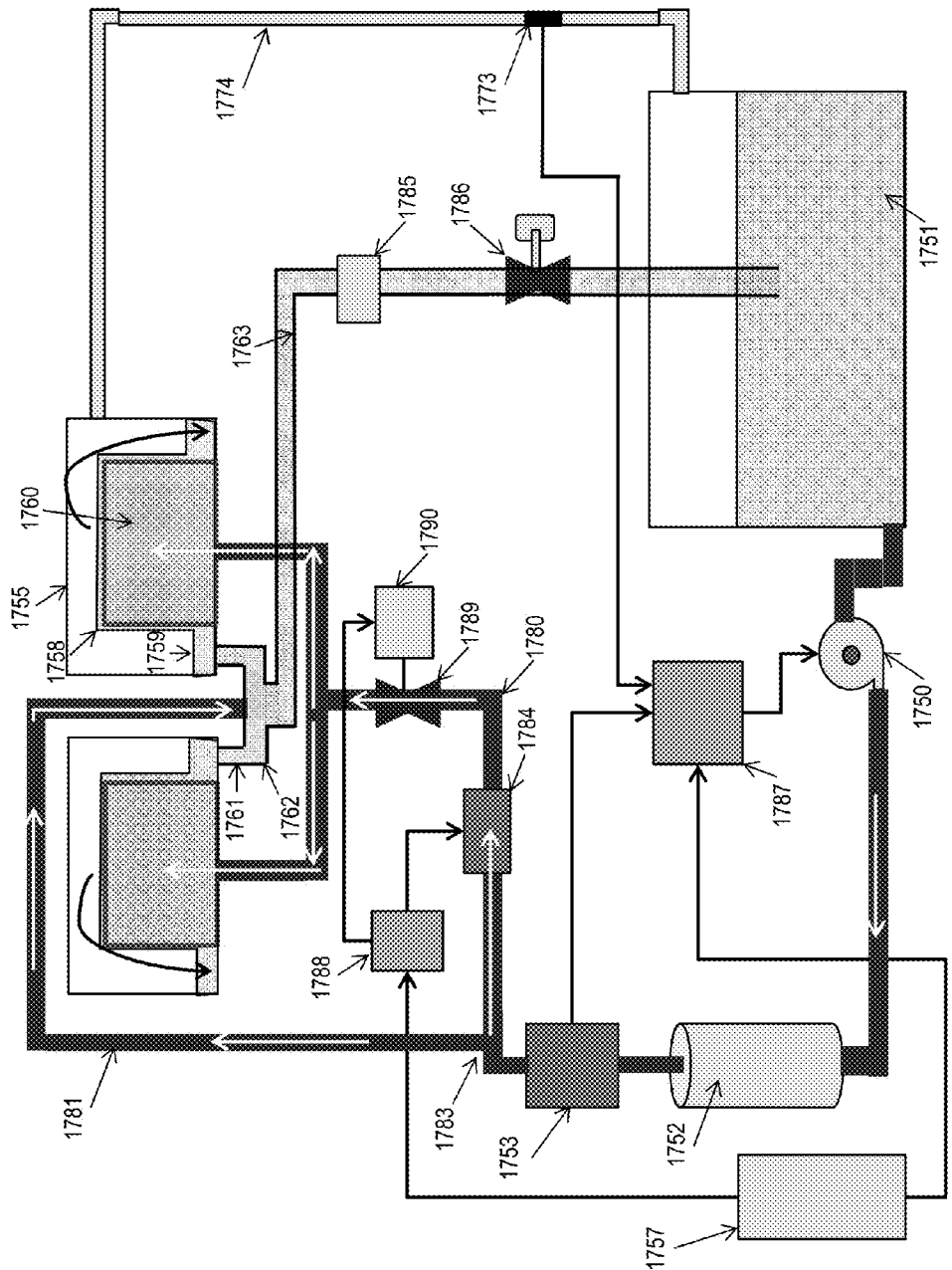
FIG. 17 shows a schematic representation of a processing system having multiple processing cells that share a recirculation system and reservoir, where variable flow diversion is used to achieve bubble-free flow.

FIG. 17 is an example of a variable flow diversion design according to certain embodiments. For clarity, in this and several of the other examples, not all permutations of possible included features are described in each embodiment, though it is recognized that these features can be incorporated in any embodiment according to desire or operational need. The basic goal of the variable flow diversion approach is to allow a variable flow rate delivered to the processing module(s) 1755, while simultaneously maintaining a drain/return conduit 1763 that is always backed up and bubble-free. This may be achieved by creating conditions where the flow rate exiting the common return region 1762 does not vary, thereby allowing a drain system with a fixed drain resistance (between the common return 1762 and the reservoir 1751) set sufficiently high to always promote a backed up and bubble-free processing module drain 1561 from the trough 1759 to the common return 1762. There are two fluid-feeding flow paths 1780 and 1781 in this approach, which merge at a point in the drain path. One flow path (the main feed flow 1780) directs fluid from the reservoir 175 into the primary fluid containment region 1760 of the processing cells 1755. From here, the main feed flow 1780 flows into the troughs 1759, down the processing module drain 1761 into the common return 1762, and into the return conduit 1763. A second flow path (the diverted flow 1781) diverts fluid off of the main feed flow 1780 at a flow diversion tee 1783, and then flows through a drain "diversion" path 1781 before rejoining the main feed flow 1780 at the common return region 1762.

As a particular example, fluid may be pumped from the reservoir 1751 though an optional filter 1750 and through a first flow meter 1753 (also sometimes referred to as a total flow meter 1753) whose function is to aide in maintaining a substantially constant total flow rate between the reservoir 1751 and the diversion tee 1783. Although this flow rate is described as substantially constant, it may be controlled/set to an appropriate level by a controller, in this case a first flow controller 1787. A target total non-diverted flow rate for the overall system (or corresponding analog signal) is set such that, with an appropriate drain flow-resistance setting, fluid will be both backed up and at an appropriate fluid level in the collection troughs 1759. The signal from the first flow meter 1753 is sent to a first flow controller 1787 (also sometimes referred to as a non-diverted flow controller 1787), where the measured flow rate from first flow meter 1753 and the target value for total (non-diverted) flow are compared. The first flow controller 1787 modifies the pump speed to obtain and maintain the target non-diverted total flow rate.

Other methods of maintaining a constant total non-diverted flow are possible, such as using a process flow valve in communication with the first flow meter, and having the first flow controller 1787 modulate the valve position of a total flow process control valve (not shown). Another method of accomplishing constant total flow in the return conduit 1783 to the reservoir 1751 is to not employ a flow diversion tee, but rather use a second dedicated pump (not shown) in place of the diversion path, and to set the flow rate of on second pump to be equal to the difference from the target total flow rate and direct fluid directly to the collection trough 1759/drain path 1761, and set and control the process module target flow rate using a first pump, where the first pump controls the target cell processing flow rate that enters the processing modules rate.

In these or other embodiments, the diverted flow 1781 may rejoin the main feed flow 1780 in the fluid collection trough 1759 or (as shown in FIG. 17) at a location close to the processing module drain 1761 (e.g., in the common return region 1762, or via a tee into a point in the drain path 1761 within a few inches of an outlet from a cell-level trough 1759). When the diverted fluid 1781 rejoins the main feed flow 1780 at a location other than a fluid collection trough 1759, this location should be chosen such that any change in the relative amount of fluid passing through the diverted flow path 1781 versus the main feed flow path 1780 will not cause an appreciable change in the pressure drop, in order to maintain the total drain pressure required for the fluid in the drain collection trough 1759 to remain at a nearly constant fluid level and backed up state.

Fluid that does not pass through the diverted flow path 1781 instead flows through the main feed flow path 1780, where it is delivered to the processing modules 1755. A second flow meter 1784 may be positioned in the main feed flow path 1780, as shown. A target process flow rate may be sent to a second flow controller 1788, and the metered process in the non-diverted portion of the main feed flow 1780 may be compared to the target process flow (i.e., the target flow rate for delivering fluid to one or more processing modules 1755). The second flow controller 1788 may modulate the position of an automated cell flow rate control valve 1789 (which restricts the flow to the processing modules 1755 as required) so that the flow in the non-diverted portion of the main feed flow 1780 is equal to the target process flow rate. This control may be done directly, or through an intermediate automated cell flow rate controller 1790. Also, the first and second flow controllers 1787 and 1788 may be controlled by a system and wafer handling process controller 1757, which may further control other aspects of the system. The two flow branches (the diverted flow 1781 and the non-diverted portion of the main feed flow 1780) merge in the common return region 1762.

An optional overflow drain line 1774 and overflow sensor 1773 may be used to accommodate and detect overflow if and when it occurs. An optional drain bubble sensor 1785 (e.g., an optical through beam bubble sensor) may be used to ensure that the system is operating according to design. Finally, a manually adjustable cell drain control valve 1786 may be used in the return conduit 1763 to achieve a desired level of fluid back up in the cell-level trough 1759. The optimal level of back up in the trough 1759 is specific to the target total system flow rate and, once set, will allow for backed up fluid conditions and bubble-free draining at the target system total flow rate. While the embodiments shown in FIGS. 15-17 depict systems in which two processing modules share a single reservoir/recirculation system, it is understood that any number of processing module may be used. In some instances, for example, only a single processing module is used. In other cases, three or more processing modules may share a reservoir and recirculation system. Further, while FIGS. 16 and 17 show only a single overflow return conduit, it is understood that each individual processing module would be equipped with its own overflow conduit. In certain embodiments these individual overflow conduits may merge before returning fluid to the reservoir.

Further Implementations

The apparatus/methods described hereinabove may be used in conjunction with lithographic patterning tools or processes, for example, for the fabrication or manufacture of semiconductor devices, displays, LEDs, photovoltaic panels and the like. Generally, though not necessarily, such tools/processes will be used or conducted together in a common fabrication facility. Lithographic patterning of a film generally comprises some or all of the following steps, each step enabled with a number of possible tools: (1) application of photoresist on a work piece, i.e., a substrate, using a spin-on or spray-on tool; (2) curing of photoresist using a hot plate or furnace or UV curing tool; (3) exposing the photoresist to visible, UV, or x-ray light with a tool such as a wafer stepper; (4) developing the resist so as to selectively remove resist and thereby pattern it using a tool such as a wet bench; (5) transferring the resist pattern into an underlying film or work piece by using a dry or plasma-assisted etching tool; and (6) removing the resist using a tool such as an RF or microwave plasma resist stripper.

It should also be noted that there are many alternative ways of implementing the disclosed methods and apparatuses. It is therefore intended that this disclosure be interpreted as including all such alterations, modifications, permutations, and substitute equivalents as fall within the true spirit and scope of the disclosed implementations.

What is claimed is:

1. An apparatus for electroplating material onto a substrate, comprising:
    an electroplating cell comprising:
        a vessel for holding electrolyte;
        a weir wall positioned at the periphery of the vessel; and
        a fluid collection trough substantially surrounding the weir wall, such that during electroplating, electrolyte flows into the vessel, over the weir wall and into the fluid collection trough;
    an electrolyte reservoir;
    a return conduit for delivering electrolyte from the fluid collection trough to the electrolyte reservoir; and
    a flow control mechanism for variably increasing and decreasing a resistance to flow in the return conduit, wherein the flow control mechanism comprises a float and a flow constrictor, wherein the float is configured to rise with the level of electrolyte in the fluid collection trough to thereby raise the flow constrictor and increase flow through the return conduit, wherein the flow control mechanism prevents the passage of gas through the return conduit during electroplating.

2. The apparatus of claim 1, wherein the flow control mechanism prevents passage of gas through the return conduit by ensuring that a level of electrolyte in the fluid collection trough does not fall below a designated minimum level.

3. The apparatus of claim 1, wherein the float and flow constrictor are separate elements connected by a connector.

4. The apparatus of claim 3, wherein the flow constrictor is substantially spherical.

5. The apparatus of claim 1, wherein the flow constrictor is shaped like a cone or truncated cone.

6. The apparatus of claim 3, wherein the flow constrictor is a flap that covers an inlet to the return conduit, wherein the flap swings about a connection point to variably control the resistance to flow through the return conduit.

7. The apparatus of claim 1, further comprising a flow constricting region in the fluid collection trough or return conduit, wherein the flow constrictor and the flow constricting region are configured to mate with one another.

8. The apparatus of claim 7, wherein the flow constrictor and the flow constricting region mate with one another to form a fluid tight seal.

9. The apparatus of claim 7, further comprising a drain path through which electrolyte may drain from the fluid collection trough into the return conduit even when the flow constrictor and the flow constricting region are mated with one another in a closed position.

10. The apparatus of claim 1, further comprising baffles positioned proximate the float and/or flow constrictor, wherein the baffles operate to prevent formation of vortices in the electrolyte.

11. The apparatus of claim 1, further comprising one or more float position constricting elements that restrict where the float may be the fluid collection trough.

12. The apparatus of claim 1, further comprising an overflow conduit for delivering electrolyte from the fluid collection trough to the electrolyte reservoir, wherein an inlet to the overflow conduit is positioned above a target fluid level in the fluid collection trough.

13. The apparatus of claim 1, further comprising an additional electroplating cell, wherein the return conduit comprises a first inlet for receiving electrolyte from the electroplating cell and a second inlet for receiving electrolyte from the additional electroplating cell.

14. The apparatus of claim 1, wherein an outlet of the return conduit is positioned below a level of electrolyte in the electrolyte reservoir.

15. The apparatus of claim 1, further comprising a secondary fluid collection trough positioned in the return conduit for holding electrolyte after it leaves the fluid collection trough and before it enters the electrolyte reservoir, and wherein the flow control mechanism is positioned in the secondary fluid collection trough.

16. An apparatus for electroplating material onto a substrate, comprising:
an electroplating cell comprising:
a vessel for holding electrolyte;
a weir wall positioned at the periphery of the vessel; and
a fluid collection trough substantially surrounding the weir wall, such that during electroplating, electrolyte flows into the vessel, over the weir wall and into the fluid collection trough;
an electrolyte reservoir;
a return conduit for delivering electrolyte from the fluid collection trough to the electrolyte reservoir;
a plating recirculation loop comprising the electrolyte reservoir, a first pump, the electroplating cell and the return conduit; and
a bypass conduit, wherein the bypass conduit branches off of the plating recirculation loop at a point before the electrolyte reaches the electroplating cell, wherein the bypass conduit rejoins the plating recirculation loop at a point after the electrolyte spills over the weir wall of the electroplating cell,
wherein the apparatus is configured to provide a substantially constant total electrolyte flow rate leaving the electrolyte reservoir and passing through the return conduit, while simultaneously allowing a variable flow rate of electrolyte delivered to the electroplating cell.

17. The apparatus of claim 16, further comprising a bubble sensor positioned in the return conduit.

18. The apparatus of claim 16, further comprising a second pump positioned in either the plating recirculation loop or the bypass conduit.

* * * * *